(12) United States Patent
Kensaku et al.

(10) Patent No.: US 10,818,921 B2
(45) Date of Patent: Oct. 27, 2020

(54) NICKEL COMPLEX HYDROXIDE PARTICLES AND NONAQUEOUS ELECTROLYTE SECONDARY BATTERY

(71) Applicant: SUMITOMO METAL MINING CO., LTD., Tokyo (JP)

(72) Inventors: Mori Kensaku, Niihama (JP); Shin Imaizumi, Niihama (JP); Rei Kokado, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 200 days.

(21) Appl. No.: 15/824,799

(22) Filed: Nov. 28, 2017

(65) Prior Publication Data

US 2018/0145326 A1 May 24, 2018

Related U.S. Application Data

(62) Division of application No. 13/513,240, filed as application No. PCT/JP2010/007040 on Dec. 2, 2010, now Pat. No. 9,859,557.

(30) Foreign Application Priority Data

Dec. 2, 2009 (JP) .................. 2009-274550

(51) Int. Cl.
*H01M 4/52* (2010.01)
*H01M 4/48* (2010.01)
(Continued)

(52) U.S. Cl.
CPC ............ *H01M 4/525* (2013.01); *C01G 53/00* (2013.01); *C01G 53/006* (2013.01); *C01G 53/42* (2013.01);
(Continued)

(58) Field of Classification Search
None
See application file for complete search history.

(56) References Cited

FOREIGN PATENT DOCUMENTS

JP          08-315822      * 11/1996    .............. H01M 4/58
JP          08-315822 A      11/1996
(Continued)

OTHER PUBLICATIONS

Notice of Reasons for Rejection received in counterpart application No. 2011-518100 by the Japanese Patent Office, dated Aug. 23, 2011, with English translation (10 pages).
(Continued)

*Primary Examiner* — Maria Laios
*Assistant Examiner* — Angela J Martin
(74) *Attorney, Agent, or Firm* — Kratz, Quintos & Hanson, LLP

(57) ABSTRACT

Disclosed are: nickel complex hydroxide particles that have small and uniform particle diameters; and a method by which the nickel complex hydroxide particles can be produced. Specifically disclosed is a method for producing a nickel complex hydroxide by a crystallization reaction, which comprises: a nucleation step in which nucleation is carried out, while controlling an aqueous solution for nucleation containing an ammonium ion supplying material and a metal compound that contains nickel to have a pH of 12.0-13.4 at a liquid temperature of 25° C.; and a particle growth step in which nuclei are grown, while controlling an aqueous solution for particle growth containing the nuclei, which have been formed in the nucleation step, to have a pH of 10.5-12.0 at a liquid temperature of 25° C. In this connection, the pH in the particle growth step is controlled to be less than the pH in the nucleation step.

13 Claims, 9 Drawing Sheets

(51) Int. Cl.
  *H01M 4/50* (2010.01)
  *C01G 53/00* (2006.01)
  *H01M 4/525* (2010.01)
  *H01M 4/485* (2010.01)
  *H01M 4/505* (2010.01)

(52) U.S. Cl.
  CPC ............ *C01G 53/50* (2013.01); *H01M 4/485* (2013.01); *H01M 4/505* (2013.01); *C01P 2004/03* (2013.01); *C01P 2004/32* (2013.01); *C01P 2004/45* (2013.01); *C01P 2004/51* (2013.01); *C01P 2004/61* (2013.01); *Y10T 428/2982* (2015.01)

(56) References Cited

FOREIGN PATENT DOCUMENTS

| | | | | |
|---|---|---|---|---|
| JP | 10-029820 | * | 2/1998 | ........... C01G 51/000 |
| JP | 10-029820 A | | 2/1998 | |
| JP | 10-214624 A | | 8/1998 | |
| JP | 2002-208400 | * | 7/2002 | ............. H01M 4/52 |
| JP | 2002-208400 A | | 7/2002 | |
| JP | 2003-086182 A | | 3/2003 | |
| JP | 2004-193115 A | | 7/2004 | |
| JP | 2004-311297 A | | 11/2004 | |
| JP | 2005-332713 A | | 12/2005 | |
| JP | 2008-147068 A | | 6/2008 | |

OTHER PUBLICATIONS

International Search Report issued for International Patent Application No. PCT/JP2010/007040 dated Mar. 15, 2011.

Notification of Reasons for Refusal dated Jan. 30, 2014, corresponding to Chinese Patent Application No. 201080061862.5, with English translation.

Notification of Reasons for Refusal dated Sep. 29, 2014, corresponding to Chinese Patent Application No. 201080061862.5, with English translation.

M.-H. Lee, et al.; Electrochimica Acta 50 (2004) 939-948; "Synthetic optimization of Li[Ni1/3Co1/3Mn1/3]O2 via co-precipitation".

* cited by examiner

F I G. 5

|  | Composite hydroxide | | Positive-electrode active material | | Battery | | |
| --- | --- | --- | --- | --- | --- | --- | --- |
|  | Average particle diameter ($\mu$m) | (d90-d10) /average particle diameter | Average particle diameter ($\mu$m) | (d90-d10)/ average particle diameter | Initial discharge capacity (mAh·g$^{-1}$) | Positive electrode resistance ($\Omega$) | 500 cycle capacity retention rate (%) |
| Example 1 | 4.4 | 0.49 | 4.5 | 0.54 | 190.7 | 3.8 | 82 |
| Example 2 | 4.4 | 0.49 | 4.9 | 0.56 | 192.2 | 3.0 | 85 |
| Example 3 | 3.3 | 0.51 | 3.7 | 0.55 | 192.4 | 2.8 | 82 |
| Example 4 | 5.6 | 0.50 | 5.8 | 0.53 | 191.5 | 3.4 | 86 |
| Example 5 | 4.2 | 0.49 | 4.6 | 0.53 | 190.8 | 3.2 | 82 |
| Example 6 | 4.1 | 0.50 | 4.5 | 0.55 | 190.1 | 3.6 | 87 |
| Example 7 | 4.2 | 0.49 | 4.5 | 0.56 | 191.4 | 3.2 | 84 |
| Example 8 | 3.7 | 0.52 | 4.2 | 0.57 | 191.7 | 3.7 | 84 |
| Example 9 | 4.3 | 0.52 | 4.8 | 0.58 | 188.5 | 4.0 | 81 |
| Example 10 | 3.7 | 0.48 | 4.3 | 0.57 | 192.5 | 3.7 | 85 |
| Example 11 | 4.3 | 0.50 | 4.5 | 0.58 | 191.5 | 3.7 | 84 |
| Comparative Example 1 | 5.1 | 0.70 | 5.6 | 0.73 | 191.8 | 4.0 | 65 |
| Comparative Example 2 | 8.0 | 0.55 | 8.5 | 0.57 | 192.8 | 6.2 | 83 |
| Comparative Example 3 | 6.2 | 0.70 | - | - | - | - | - |
| Comparative Example 4 | 4.4 | 0.49 | 10.1 | 0.70 | - | - | - |
| Comparative Example 5 | 4.4 | 0.49 | 4.2 | 0.53 | 165.5 | 21.0 | - |

F I G. 6
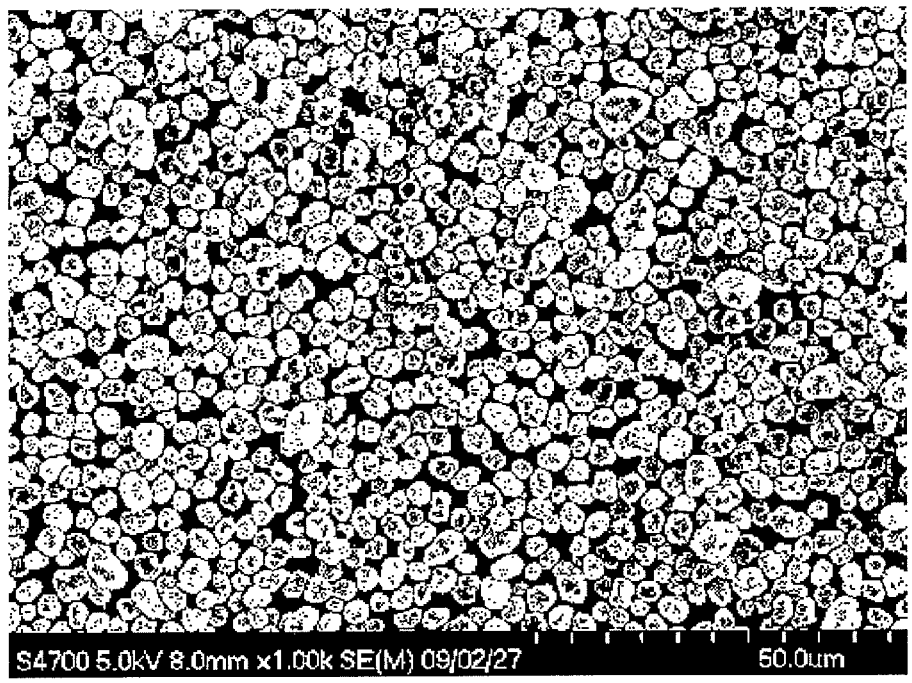

F I G. 7
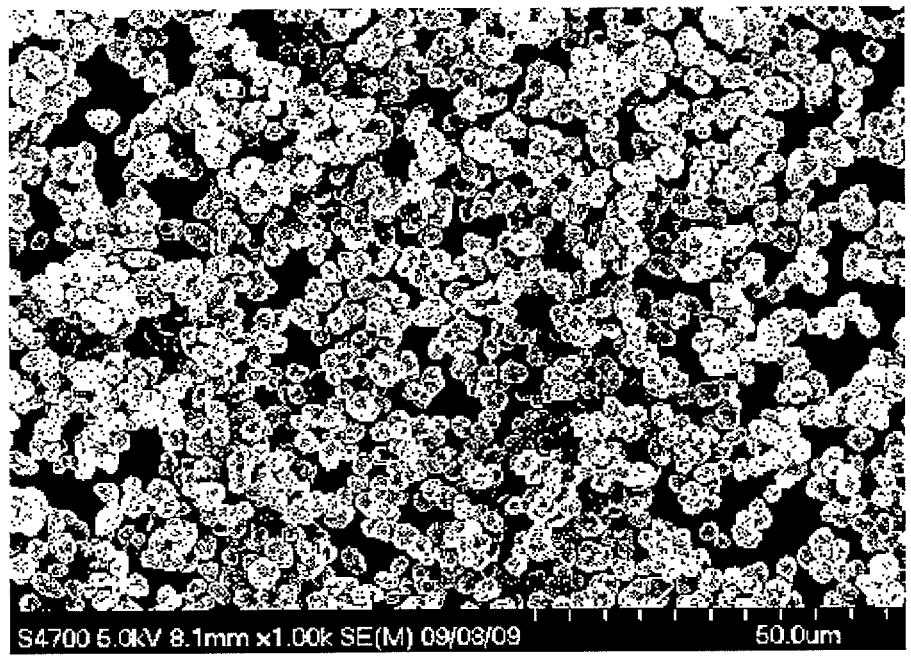

NICKEL COMPLEX HYDROXIDE PARTICLES AND NONAQUEOUS ELECTROLYTE SECONDARY BATTERY

TECHNICAL FIELD

The present invention relates to nickel composite hydroxide particles and a nonaqueous electrolyte secondary battery. More particularly, the present invention relates to nickel composite hydroxide particles and a process for producing the same, a cathode active material for a nonaqueous electrolyte secondary battery and a process for producing the same, and a nonaqueous electrolyte secondary battery.

BACKGROUND ART

In recent years, along with the spread of mobile electronic devices such as mobile phones and notebook-sized personal computers, development of a small and light nonaqueous electrolyte secondary battery having a high energy density has been earnestly desired. In addition, development of a high power secondary battery has been earnestly desired as a battery for electric automobiles typified by hybrid automobiles. The secondary battery which meets the above requirement is a lithium ion secondary battery. The lithium ion secondary battery is composed of a negative electrode, a positive electrode, an electrolyte and the like, and a material capable of desorbing and inserting lithium has been used as an active material for the negative electrode and the positive electrode.

Research and development of the lithium ion secondary batteries have been extensively carried out at present. Among them, the practical application of a lithium ion secondary battery in which a layer or spinel type lithium metal composite oxide is used as a positive electrode material has been progressed as a battery having a high energy density, since the battery gives a high voltage as high as 4 V.

As a positive electrode material for use in the lithium ion secondary battery, there have been hitherto proposed lithium composite oxides such as lithium cobalt composite oxide ($LiCoO_2$) which can be relatively easily synthesized, lithium-nickel composite oxide ($LiNiO_2$) in which nickel being less expensive than cobalt is used, lithium nickel cobalt manganese composite oxide ($LiNi_{1/3}CO_{1/3}Mn_{1/3}O_2$), and lithium manganese composite oxide ($LiMn_2O_4$) in which manganese is used.

In order to impart favorable performance (high cycle characteristic, low resistance and high power) to a positive electrode, it has been required for the positive electrode material to be composed of particles having a uniform and appropriate particle diameter. This is because the reaction area of the material with the electrolyte cannot be sufficiently ensured when a material having a large particle diameter and a small specific surface area is used, and because there arise defects such as lowering of battery capacity and increase of reaction resistance when a material having a broad particle size distribution is used. Incidentally, the reason why the battery capacity is lowered is that the voltage applied to the particles in the electrode becomes uneven, and thereby finer particles selectively deteriorate when charge and discharge are repeated.

Additionally, it is effective for increasing the output of a battery to shorten the transferring distance of lithium ions between a positive electrode and a negative electrode. Therefore, it has been desired to thin the positive electrode plate, and therefore, cathode active material particles having a smaller particle diameter are useful for this desire.

Accordingly, it is necessary to produce the above-mentioned lithium-nickel composite oxide particles having a small particle diameter and a uniform particle diameter.

The lithium-nickel composite oxide is usually prepared from a composite hydroxide. Therefore, in order to prepare a lithium-nickel composite oxide particle having a small particle diameter and a uniform particle diameter, it is necessary to use a composite hydroxide having a small particle diameter and a uniform particle diameter as a starting material. In other words, in order to produce a final product, that is, a lithium ion secondary battery having high performance by improving performance of a positive electrode material, it is necessary to use a composite hydroxide composed of particles having a small particle diameter and a narrow particle size distribution as a composite hydroxide which is employed as the source material of the lithium-nickel composite oxide for forming the positive electrode material.

Patent Document 1 discloses a lithium composite oxide in the form of particles having a particle size distribution in which the average particle diameter D50, which means a particle diameter of the particles having an accumulation frequency of 50%, is 3 to 15 μm, and in which the minimum particle diameter is not smaller than 0.5 μm, and the maximum particle diameter is not greater than 50 μm in the particle size distribution curve; and in the relationship between D10 which means a particle diameter of the particles having an accumulation frequency of 10% and D90 which means a particle diameter having an accumulation frequency of 90%, D10/D50 is from 0.60 to 0.90, and D10/D90 is from 0.30 to 0.70. In addition, this document discloses that a lithium ion nonaqueous electrolytic solution secondary battery having excellent output characteristics and a small lowering of cycle characteristics can be obtained by using this lithium composite oxide, since the lithium composite oxide has high repletion property, excellent charge and discharge capacity characteristics and high power characteristics, and is not deteriorated even under the conditions such as a large charging and discharging load.

In addition, various processes for producing composite hydroxides have been proposed (see for example, Patent Documents 2 and 3).

Patent Document 2 proposes a method for producing a cathode active material for nonaqueous electrolyte batteries, in which a precursor, an oxide or a hydroxide is obtained by a process comprising charging a reaction vessel with an aqueous solution containing at least two kinds of transition metal salts or at least two kinds of aqueous solutions each of which contains a different transition metal with each other, and an alkali solution at the same time, and carrying out coprecipitation under the existence of a reducing agent or while blowing an inert gas into the solution.

Patent Document 3 also discloses a method for producing a cathode active material for a lithium secondary battery. This document discloses that lithium-coprecipitated composite metal salt particles having an approximately spherical shape are prepared with a reaction vessel by continuously feeding an aqueous solution of a composite metal salt in which the concentration of the salt is controlled by dissolving a salt having an element which constitutes the above-mentioned active substance in water, a water-soluble complexing agent which forms a complex salt with a metal ion, and an aqueous solution of lithium hydroxide to a reaction vessel, respectively, to generate a composite metal complex salt; thereafter decomposing this complex salt with lithium hydroxide, to extract a lithium-coprecipitated composite metal salt; carrying out the generation and decomposition of the above-mentioned complex salt repeatedly while circulating in the reaction vessel; overflowing the lithium-coprecipitated composite metal salt to take out. This document also discloses that the cathode active material in which the composite metal salt obtained in this process is used as a source material has a high packing density, homogenous components and a nearly spherical shape.

However, the lithium composite oxide disclosed in Patent Document 1 includes very fine particles and coarse particles, since the minimum particle diameter is 0.5 μm or more, and the maximum particle diameter is not greater than 50 μm in contrast to the average particle diameter of 3 to 15 μm. Therefore, it cannot be said that the range of the particle size distribution as defined by the above-mentioned D10/D50 and D10/D90 is narrow in the particle diameter distribution. In other words, since it cannot be said that the lithium composite oxide of Patent Document 1 have particles having uniform particle diameters, it cannot be expected to improve the performance of the positive electrode material even though the lithium composite oxide is employed, and it is difficult to obtain a lithium ion nonaqueous electrolytic solution secondary battery having sufficient performance.

On the other hand, Patent Document 2 discloses a method for producing a composite oxide. However, since crystals generated are collected by classification, it is necessary to strictly control the condition for producing. Therefore, it is difficult to produce in an industrial scale. Moreover, according to this process, even though particles having a large particle diameter can be obtained, it is difficult to obtain particles having a small particle diameter.

Patent Document 3 also discloses a continuous crystallization method which comprises taking out a product by overflowing. According to the method, since the particle size distribution becomes a normal distribution, and is likely to be spread, it is difficult to obtain almost uniform particles having a small particle diameter.

As described above, a composite hydroxide which sufficiently improves the performance of a lithium-secondary battery has not yet been developed. Furthermore, although various processes for preparing a composite hydroxide have been also examined, there has not yet been developed a process which enables to prepare in an industrial scale a composite hydroxide which can sufficiently improve the performance of a lithium secondary battery at the present time. Therefore, it has been desired to develop a process which enables to prepare this composite hydroxide.

PRIOR ART DOCUMENTS

Patent Documents

Patent Document 1: Japanese Unexamined Patent Application Publication No. 2008-147068
Patent Document 2: Japanese Unexamined Patent Application Publication No. 2003-86182
Patent Document 3: Japanese Unexamined Patent Application Publication No. Hei 10-214624

SUMMARY OF THE INVENTION

Problems to be Solved by the Invention

The present invention has been developed in view of the above-mentioned prior arts, and an object of the present invention is to provide nickel composite hydroxide particles having a small particle diameter and high uniformity of the particle diameter, and a process which enables to prepare the nickel composite hydroxide particles.

Another object of the present invention is to provide a cathode active material for a nonaqueous secondary battery, which enables to decrease the resistance of a positive electrode when the cathode active material is used in a battery, and a process for producing the same.

Still another object of the present invention is to provide a nonaqueous electrolyte secondary battery which is excellent in cycling characteristics, and possesses a high power.

Means for Solving the Problems (Process for Producing Nickel Composite Hydroxide Particles)

According to the first aspect of the present invention concerning a process for producing nickel composite hydroxide particles, there are obtained particles of a nickel composite hydroxide represented by the general formula (I):

$$Ni_{1-x-y}Co_xM_y(OH)_{2+\alpha} \qquad (I)$$

wherein $0 \leq x \leq 0.2$, $0 \leq y \leq 0.15$, $x+y<0.3$, $0 \leq \alpha \leq 0.5$, and M is at least one element selected from the group consisting of Mg, Al, Ca, Ti, V, Cr, Mn, Zr, Nb, Mo and W. This process includes a step for nucleation, which includes controlling the pH to 12.0 to 13.4 of an aqueous solution for nucleation containing a metal compound having an atomic ratio of the metal corresponding to the atomic ratio of the metal of the particles of the nickel composite oxide and an ammonium ion donor at a liquid temperature of 25° C., to carry out nucleation, and a step for growth of particles, which comprises controlling the pH to 10.5 to 12.0 of the aqueous solution for the growth of particles containing a nuclei obtained in the step for nucleation at a liquid temperature of 25° C., to grow the nuclei, and the pH in the step for growth of particles is controlled so as to be less than the pH in the step for nucleation.

According to the second aspect of the present invention concerning a process for producing nickel composite hydroxide particles, after the step for nucleation is completed in the first aspect of the present invention, the pH of the above-mentioned aqueous solution for nucleation is controlled, to form the above-mentioned aqueous solution for nuclei growth.

According to the third aspect of the present invention concerning a process for producing nickel composite hydroxide particles, in the first aspect of the present invention, an aqueous solution suitable for nucleation is formed, and nuclei formed in the above-mentioned step for nucleation are added to the aqueous solution, to form the above-mentioned aqueous solution for growth of nuclei.

According to the fourth aspect of the present invention concerning a process for producing nickel composite hydroxide particles, in the first, second or third aspect of the present invention, after the completion of the above-mentioned step for nucleation, a part of liquid portion of the above-mentioned aqueous solution for growth of particles is discharged, and thereafter, the above-mentioned step for growth of particles is carried out.

According to the fifth aspect of the present invention concerning a process for producing nickel composite hydroxide particles, in the first, second, third or fourth aspect of the present invention, the temperature of each aqueous solution in the above-mentioned step for nucleation and the above-mentioned step for growth of particles is maintained to 20° C. or more.

According to the sixth aspect of the present invention concerning a process for producing nickel composite hydroxide particles, in the first, second, third, fourth or fifth aspect of the present invention, the concentration of ammonium ion is maintained within the range of 3 to 25 g/L in the above-mentioned step for nucleation and the above-mentioned step for growth of particles.

According to the seventh aspect of the present invention concerning a process for producing nickel composite hydroxide particles, in the first, second, third, fourth or fifth or sixth aspect of the present invention, the nickel composite hydroxide obtained in the step for growth of particles is covered with a compound having at least one additive element mentioned above in its molecule.

(Nickel Composite Hydroxide Particles)

The nickel composite hydroxide particles according to the eighth aspect of the present invention are characterized in that the nickel composite hydroxide particles include the nickel composite hydroxide represented by the general formula (I):

$$Ni_{1-x-y}Co_xM_y(OH)_{2+\alpha} \quad (I)$$

wherein $0 \leq x \leq 0.2$; $0 \leq y \leq 0.15$; $x+y<0.3$; $0 \leq \alpha \leq 0.5$; and M is an additive element and is at least one element selected from the group consisting of Mg, Al, Ca, Ti, V, Cr, Mn, Zr, Nb, Mo and W; that the nickel composite hydroxide particles are spherical secondary particles formed by the aggregation of plural platelike primary particles; that the secondary particles have an average particle diameter of 3 to 7 μm; and that the value of [(d90−d10)/average particle diameter] which is an index showing the spread of a particle size distribution is 0.55 or less.

The nickel composite hydroxide particles according to the ninth aspect of the present invention are the nickel composite hydroxide particles according to the eighth aspect of the present invention, wherein the above-mentioned additive element is uniformly distributed in the above-mentioned secondary particles, and/or the surface of the secondary particles are uniformly covered with the additive element.

The nickel composite hydroxide particles according to the tenth aspect of the present invention are the nickel composite hydroxide particles according to the eighth or ninth aspect of the present invention, wherein the nickel composite hydroxide particles are produced by the process according to any one of the first to seventh aspects of the present invention.

(Process for Producing Cathode Active Material for a Nonaqueous Electrolyte Secondary Battery)

A process for producing a cathode active material for a nonaqueous electrolyte secondary battery according to the eleventh aspect of the present invention is a process for producing a cathode active material including a lithium-nickel composite oxide represented by the general formula (II):

$$Li_tNi_{1-x-y}Co_xM_yO_2 \quad (II)$$

wherein: $0.95 \leq t \leq 1.15$; $0 \leq x \leq 0.2$; $0 \leq y \leq 0.15$; $x+y<0.3$; and M represents at least one element selected from the group consisting of Mg, Al, Ca, Ti, V, Cr, Mn, Zr, Nb, Mo and W; wherein the method includes a step for heat-treating the nickel composite hydroxide particles according to any one of the eighth to tenth aspects of the present invention; a mixing step for mixing a lithium compound with the particles after the above-mentioned heat-treatment to form a mixture; and a calcinating step for calcinating the mixture formed in the mixing step at a temperature of 700° C. to 850° C.

The process for producing the cathode active material for a nonaqueous electrolyte secondary battery according to the twelfth aspect of the present invention is a process according to the eleventh aspect of the present invention, wherein the ratio of the number of lithium atoms included in the above-mentioned mixture to the sum of the numbers of metal atoms other than lithium (number of lithium atoms/sum of the numbers of metal atoms other than lithium) is controlled to from 0.95/1 to 1.15/1.

The process for producing the cathode active material for a nonaqueous electrolyte secondary battery according to the thirteenth aspect of the present invention is a process according to the eleventh or twelfth aspect of the present invention, characterized in that prior to the above-mentioned calcinating step, precalcination is carried out at a temperature which is less than the temperature of the above-mentioned calcinating, at which the lithium compound has a reactivity to the particles after the above-mentioned heat-treatment.

(Cathode Active Material for a Nonaqueous Electrolyte Secondary Battery)

The cathode active material for a nonaqueous electrolyte secondary battery according to the fourteenth aspect of the present invention is a cathode active material includes a lithium-nickel composite oxide constituted with a lithium-containing composite oxide, represented by the general formula (II):

$$Li_tNi_{1-x-y}Co_xM_yO_2, \quad (II)$$

wherein: $0.95 \leq t \leq 1.15$; $0 \leq x \leq 0.2$; $0 \leq y \leq 0.15$; $x+y<0.3$; and M represents at least one element selected from the group consisting of Mg, Al, Ca, Ti, V, Cr, Mn, Zr, Nb, Mo and W; which has an average particle diameter of 2 to 8 μm, and a value of [(d90−d10)/average particle diameter] which is an index showing the spread of the particle size distribution being 0.60 or less.

The cathode active material for a nonaqueous electrolyte secondary battery according to the fifteenth aspect of the present invention is a cathode active material according to the fourteenth invention, which is produced by the process according to any one of the eleventh, twelfth or thirteenth aspect of the present invention.

(Nonaqueous Electrolyte Secondary Battery)

The nonaqueous electrolyte secondary battery according to the sixteenth aspect of the present invention includes a positive electrode which is formed from the cathode active material for a nonaqueous electrolyte secondary battery according to the fourteenth or fifteenth aspect of the present invention.

Effects of the Invention (Process for Producing Nickel Composite Hydroxide Particles)

According to the first aspect of the present invention, the growth of nuclei can be suppressed by controlling the pH of an aqueous solution for nucleation to 12.0 to 13.4 at its liquid temperature of 25° C., and therefore, only the nucleation can be substantially carried out in the step for nucleation. In addition, only the growth of nuclear can be preferentially carried out by controlling the pH of an aqueous solution for growth of particles to 10.5 to 12.0 at a liquid temperature of 25° C., and therefore, the formation of new nuclei can be suppressed. Since the nuclei can homogenously grow up in the above processes, uniform nickel composite hydroxide particles having a narrow range of the particle size distribution can be obtained.

According to the second aspect of the present invention, since the aqueous solution for growth of particles is obtained by controlling the pH of the aqueous solution for nucleation, which is obtained after the completion of the step for nucleation, transferring to the step for growth of particles can be smoothly carried out.

According to the third aspect of the present invention, since the nucleation can be more distinctly separated from the growth of particles, the liquid state in each step can be controlled to the most suitable conditions for each step. Therefore, nickel composite hydroxide particles can be produced so as to have a narrower range of the particle size distribution and to be uniform.

According to the fourth aspect of the present invention, since the concentration of the nickel composite hydroxide particle in the aqueous solution for nucleation can be increased, the particles can grow up in the state of a higher concentration of the particles. Therefore, the particle size distribution of the particles can be further narrowed, and the particle density also can be increased.

According to the fifth aspect of the present invention, since the control of the generation of nuclei can be facilitated, the nuclei suited for producing uniform nickel composite hydroxide particles having a narrow range of particle size distribution can be formed.

According to the sixth aspect of the present invention, since the solubility of the metal ions can be controlled to fall within a specified range, particles having regulated shapes and particle diameters can be formed, and the particle size distribution can be also narrowed.

According to the seventh aspect of the present invention, the durability and output characteristics of a battery can be improved when the cathode active material for a battery, which is formed from the nickel composite hydroxide particles produced by the process according to the present invention as a source material, is used in the battery.

(Nickel Composite Hydroxide Particles)

According to the eighth aspect of the present invention, when the nickel composite hydroxide particles are mixed with a lithium compound, and the resulting mixture is calcinated, since lithium can be sufficiently diffused into the nickel composite hydroxide particles, a favorable cathode active material having homogenous distribution of lithium can be obtained. In addition, when the cathode active material is produced from the nickel composite hydroxide particles as a source material, the cathode active material can be provided as uniform particles having a narrow range of the particle size distribution. Therefore, when a battery having a positive electrode made of the cathode active material is formed, the electrode resistance can be reduced, and deterioration of the electrode can be suppressed even though charge and discharge are repeatedly carried out.

According to the ninth aspect of the present invention, when a cathode active material for a battery is formed from the nickel composite hydroxide particles of the present invention as a source material, and the cathode active material is used in a battery, durability and output characteristics of the battery can be improved.

According to the tenth aspect of the present invention, since uniform nickel composite hydroxide particles having a narrow range of the particle size distribution can be prepared, when a cathode active material is produced from the nickel composite hydroxide particles as a source material, the cathode active material can be also produced as uniform particles having a narrow range of the particle size distribution. Therefore, when a battery having a positive electrode made of this cathode active material is formed, since the electrode resistance can be reduced, deterioration of the electrode can be inhibited even though charge and discharge are repeatedly carried out.

(Process for Producing Cathode Active Material for Nonaqueous Electrolyte Secondary Battery)

According to the eleventh aspect of the present invention, since residual water in the nickel composite hydroxide particles can be removed by a heat treatment, the variation of ratio of the number of lithium atoms to the sum of the numbers of metal atoms contained in the produced lithium-nickel composite oxide can be prevented. Moreover, since calcinating is carried out at a temperature of 750° C. to 850° C., lithium can be sufficiently diffused in the particles, and the spherical shape of the particle can be maintained. Therefore, when a battery having a positive electrode formed from the produced cathode active material is produced, a battery capacity can be increased, and a positive electrode resistance can be also reduced.

According to the twelfth aspect of the present invention, when a positive electrode is formed by using the obtained cathode active material, reaction resistance on the positive electrode can be reduced, and lowering of initial discharge capacity can also be avoided.

According to the thirteenth aspect of the present invention, since lithium is sufficiently diffused, a uniform lithium-nickel composite oxide can be obtained.

(Cathode Active Material for Nonaqueous Electrolyte Secondary Battery)

According to the fourteenth aspect of the present invention, when the cathode active material for a nonaqueous electrolyte secondary battery is used in a battery, high power characteristics and high capacity of a battery can be realized.

According to the fifteenth aspect of the present invention, since the cathode active material is provided as uniform particles having a narrow range of the particle size distribution, when a battery having a positive electrode made of this cathode active material is formed, the electrode resistance can be reduced, and deterioration of the electrode can be suppressed even though charge and discharge are repeatedly carried out.

(Nonaqueous Electrolyte Secondary Battery)

According to the sixteenth aspect of the present invention, since a battery having a high initial discharge capacity of 180 mAh/g or more and a low positive electrode resistance is obtained, thermal stability and safety can be improved.

BRIEF DESCRIPTION OF THE DRAWINGS

FIG. 5 is a table showing the results of Examples and Comparative Examples.

FIG. 6 is an SEM photograph (magnification: 1,000) of the nickel composite hydroxide of the present invention.

FIG. 7 is an SEM photograph (magnification: 1,000) of the lithium-nickel composite oxide of the present invention.

MODE FOR CARRYING OUT THE INVENTION

Figure 1:
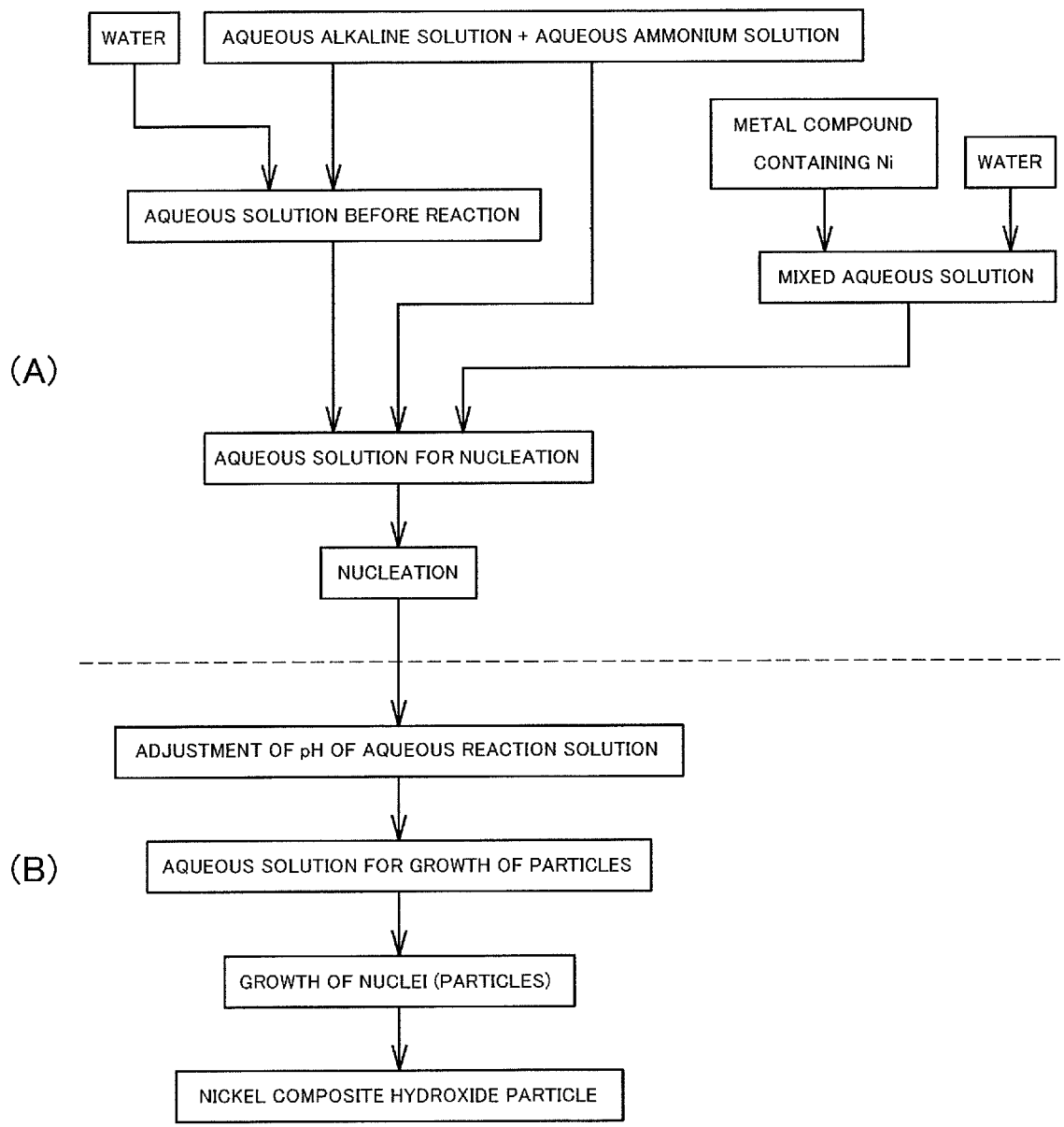
FIG. 1 is a schematic flow chart illustrating the steps for producing the nickel composite hydroxide of the present invention.

As above-mentioned, the present invention relates to (1) a nonaqueous electrolyte secondary battery; (2) a cathode active material for a nonaqueous electrolyte secondary battery used in a positive electrode of the nonaqueous electrolyte secondary battery and a process for producing the same; (3) nickel composite hydroxide particles which are used as a source material of the cathode active material for a nonaqueous electrolyte secondary battery and a process for producing the same.

In order to improve the performance of a nonaqueous electrolyte secondary battery, there is a necessity to use an electrode in which a cathode active material for a nonaqueous electrolyte secondary battery which is excellent in battery characteristics. In order to obtain a cathode active material for a nonaqueous electrolyte secondary battery which is excellent in battery characteristics, the particle diameter and particle size distribution thereof are important factors, and a cathode active material having a desired particle diameter and being regulated to have a desired particle size distribution is preferred. In order to obtain the cathode active material, there is a necessity to use nickel composite hydroxide particles having a desired particle diameter and a desired particle size distribution as a source material thereof.

As above-mentioned, the present invention relates to a process for producing nickel composite hydroxide particles having a narrow range of the particle size distribution which affects the performance of a final product, a nonaqueous electrolyte secondary battery and a nickel composite hydroxide particles produced by this method.

In addition, the aspect of the present invention also involves a process for producing a cathode active material for a nonaqueous electrolyte secondary battery having a desired particle diameter and being regulated to have a desired particle size distribution, in which the uniform nickel composite hydroxide particles having a narrow range of the particle size distribution produced by the above-mentioned process is used as a source material, and the cathode active material for a nonaqueous electrolyte secondary battery which is produced by this method are also involved in aspects of the present invention. Furthermore, the aspect of the present invention also involves a nonaqueous electrolyte secondary battery having a positive electrode produced by the process according to the present invention, in which the cathode active material for a nonaqueous electrolyte secondary battery having a desired particle diameter and being regulated to have a desired particle size distribution is used.

The present invention will be specifically described hereinafter. Prior to the description of a process for producing nickel composite hydroxide particles and nickel composite hydroxide particles, which are the greatest characteristics of the present invention, hereinafter are described a nonaqueous electrolyte secondary battery which is a final product; a process for producing a cathode active material for a nonaqueous electrolyte secondary battery in which nickel composite hydroxide particles are used as a source material; and the cathode active material for a nonaqueous electrolyte secondary battery.

(1) Nonaqueous Electrolyte Secondary Battery

Figure 4:
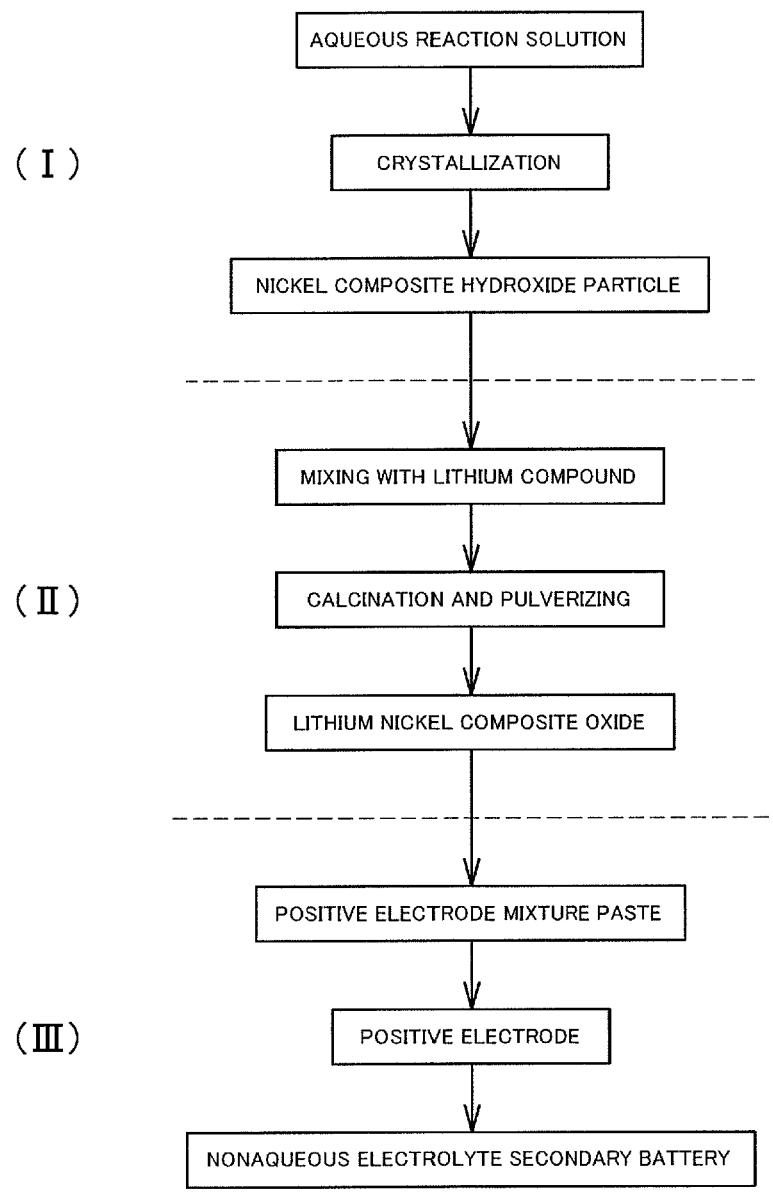
FIG. 4 is a schematic flow chart illustrating the steps from the production of the nickel composite hydroxide of the present invention to the production of a nonaqueous electrolyte secondary battery.

The nonaqueous electrolyte secondary battery of the present invention has a positive electrode formed from a cathode active material for a nonaqueous electrolyte secondary battery (2) which is described later as shown in FIG. 4. Since the positive electrode is used in the nonaqueous electrolyte secondary battery of the present invention, the battery has a high initial discharge capacity of 180 mAh/g or more and a low positive electrode resistance, and is excellent in thermal stability and safety.

First of all, the structure of a nonaqueous electrolyte secondary battery of the present invention is explained.

The nonaqueous electrolyte secondary battery of the present invention (hereinafter, simply referred to as "secondary battery of the present invention") has a structure substantially the same as the structure of usual nonaqueous electrolyte secondary batteries, except that the cathode active material for a nonaqueous electrolyte secondary battery according to the present invention (hereinafter, simply referred to as "cathode active material of the present invention") is used as a material of the positive electrode.

Specifically, the secondary battery of the present invention is provided with a case, a positive electrode, a negative electrode, a nonaqueous electrolytic solution and a separator which are accommodated in this case. More specifically, the secondary battery of the present invention is formed by laminating a positive electrode with a negative electrode via a separator to form an electrode assembly, impregnating a nonaqueous electrolytic solution into the obtained electrode assembly, connecting a positive electrode collector of the positive electrode with a positive electrode terminal which is communicated with an exterior, and a negative electrode collector of a negative electrode with a negative electrode terminal which is communicated with the exterior by using a lead for power collection or the like respectively, and closing the case. Incidentally, the structure of the secondary battery of the present invention is not limited to the above-mentioned exemplified ones, and various external forms such as a cylindrical shape and a laminated layer structure can be employed.

(Structure of Each Part)

Next, the structure of each part used in the secondary battery of the present invention is explained.

(Positive Electrode)

First of all, the positive electrode which is one of the characteristics of the secondary battery of the present invention is described below.

The positive electrode is a sheet material, and is formed by coating a paste for forming a positive electrode, which contains the cathode active material of the present invention on, for example, the surface of a collector made of an aluminum foil, and drying the paste.

Incidentally, the positive electrode is appropriately processed to meet the battery used. For example, a cutting processing for forming into an appropriate size in accordance with the size of a battery intended, a compression processing such as roll pressing for increasing electrode density and the like are carried out.

(Positive Electrode Mixture Paste)

The paste for forming a positive electrode is obtained by adding a solvent to the positive electrode mixture, followed by kneading. In addition, the positive electrode mixture is obtained by mixing the powdery cathode active material of the present invention, an electrically conductive material and a binder.

The electrically conductive material is used in order to impart adequate electric conductivity to an electrode. The electrically conductive material is not particularly limited, and there can be cited, for example, carbon blacks such as graphite (natural graphite, artificial graphite, expanded graphite and the like), acetylene black and Ketjen black; and the like.

The binder plays a role in binding the cathode active material particles. The binder for use in the positive electrode mixture is not particularly limited, and there can be cited, for example, polyvinylidene fluoride (PVDF), polytetrafluoroethylene (PTFE), fluorine rubber, ethylene-propylene-diene rubber (EPR), styrene-butadiene rubber (SBR), cellulose, polyacrylic acid, and the like.

Incidentally, to the positive electrode mixture may be added an activated carbon, and the like. The electric double layer capacity of the positive electrode can be increased by adding the activated carbon and the like.

The solvent is used in order to dissolve the binder, and disperse a cathode active material, an electrically conductive material, activated carbon and the like in the binder. This solvent is not particularly limited, and there can be cited, for example, an organic solvent such as N-methyl-2-pyrrolidone.

In addition, the mixing ratio of each substance used in the paste for forming a positive electrode is not particularly limited. For example, based on 100 parts by mass of solids of the positive electrode mixture from which a solvent is removed, the amount of the cathode active material can be 60 to 95 parts by mass, the amount of the electrically conductive material can be 1 to 20 parts by mass, and the amount of the binder can be 1 to 20 parts by mass, in the same manner as in the usual positive electrodes of nonaqueous electrolyte secondary batteries.

(Negative Electrode)

The negative electrode is a sheet material formed by coating a paste for forming a negative electrode on the surface of a foil collector of a metal such as copper, and drying the paste. The components which constitute the paste for forming a negative electrode and a material of a collector used in this negative electrode are different from those used in the positive electrode. This negative electrode can be formed in the substantially same manner as in the positive electrode as described above. As occasion demands, various treatments are applied to the negative electrode as well as the positive electrode.

The paste for forming a negative electrode is prepared by adding a suitable solvent to a negative electrode mixture which is prepared by mixing a anode active material with a binder, to form a paste.

As the anode active material, there can be used, for example, a lithium-containing material such as metal lithium or a lithium alloy, or a storage substance capable of storing and desorbing lithium ions.

The storage substance is not particularly limited, and there can be cited, for example, natural graphite, artificial graphite, calcinated products of an organic compound such as a phenol resin, and powdery matter of a carbon substance such as coke, and the like. When the storage substance is used in the anode active material, a fluorocarbon-containing resin such as polyvinylidene fluoride (PVDF) can be used as a binder as well as the positive electrode. In order to disperse the anode active material in the binder, a solvent can be used. The solvent includes, for example, an organic solvent such as N-methyl-2-pyrrolidone.

(Separator)

A separator is disposed to be sandwiched between the positive electrode and the negative electrode. The separator has a function for separating the positive electrode from the negative electrode and a function for retaining the electrolyte. As the separator, there can be used a thin membrane made of, for example, polyethylene or polypropylene, and having many fine pores. However, the separator is not particularly limited thereto as long as the separator has the above-mentioned functions.

(Nonaqueous Electrolytic Solution)

The nonaqueous electrolytic solution is prepared by dissolving a lithium salt as a supporting salt in an organic solvent.

The organic solvent includes, for example, cyclic carbonates such as ethylene carbonate, propylene carbonate, butylene carbonate and trifluoropropylene carbonate; chain carbonates such as diethyl carbonate, dimethyl carbonate, ethylmethyl carbonate and dipropyl carbonate; ether compounds such as tetrahydrofuran, 2-methyltetrahydrofuran and dimethoxyethane; sulfur compounds such as ethylmethylsulfone and butanesulfone; phosphorus compounds such as triethyl phosphate and trioctyl phosphate; and the like. The present invention is not limited to those exemplified ones. These organic compounds may be used alone, or may be used by mixing at least two kinds thereof.

As the supporting salt, there can be cited, for example, $LiPF_6$, $LiBF_4$, $LiClO_4$, $LiAsF_6$, $LiN(CF_3SO_2)_2$, and composite salts thereof.

Incidentally, the nonaqueous electrolytic solution may contain a radical scavenger, a surface active agent, a fire retardant and the like in order to improve the characteristics of a battery.

(Characteristics of Secondary Battery of the Present Invention)

Since the secondary battery of the present invention has the above-mentioned constituents, and the above-mentioned positive electrode is used therein, the secondary battery has a high capacity and a high power, as well as a high initial discharge capacity of 180 mAh/g or more and a low positive electrode resistance. Moreover, the secondary battery is excellent in thermal stability and safety in comparison with conventional cathode active materials made of lithium nickel oxide.

(Uses of a Secondary Battery of the Present Invention)

Since the secondary battery of the present invention has the above-mentioned properties, the secondary battery can be used as an electric power supply for a small size mobile electronic device which always requires a high capacity (notebook-sized personal computer, mobile phone terminal, and the like). In addition, the secondary battery of the present invention is also suitably used as a battery for an electric automobile which requires a high power. When a battery for an electric automobile has a larger size, ensuring of safety will be difficult, and an expensive protective circuit will be essential. In contrast, since the secondary battery of the present invention has excellent safety without increasing in size of a battery, not only ensuring of safety is facilitated, but also an expensive protective circuit can be simplified, and cost can be more reduced. In addition, since the secondary battery can be miniaturized and provide a higher output, the secondary battery can be suitably used as an electric power supply for an electric automobile which is restricted by a mounting space. The secondary battery of the present invention can be also used not only as an electric power supply for an electric automobile which is driven only by electric energy but also as an electric power supply for a so-called hybrid automobile in which a combustion engine such as a gasoline engine or a diesel engine is used in combination.

(2) Cathode Active Material for Nonaqueous Electrolyte Secondary Battery

The cathode active material for a nonaqueous electrolyte secondary battery according to the present invention (hereinafter, referred to as "cathode active material of the present invention") is suited for a material of a positive electrode of a nonaqueous electrolyte secondary battery as described above.

The cathode active material of the present invention includes lithium-nickel composite oxide particles represented by the general formula (II):

$$Li_tNi_{1-x-y}Co_xM_yO_2, \quad (II)$$

wherein $0.95 \leq t \leq 1.15$, $0 \leq x \leq 0.2$, $0 \leq y \leq 0.15$, $x+y<0.3$, and M is at least one element selected from the group consisting of Mg, Al, Ca, Ti, V, Cr, Mn, Zr, Nb, Mo and W.

The crystal structure of the cathode active material of the present invention is not particularly limited. It is preferred that the crystal structure is a hexagonal crystal structure having a layer structure based upon the lithium-nickel composite oxide which has been usually used as a cathode active material.

(Particle Size Distribution)

The cathode active material of the present invention is controlled so that [(d90−d10)/average particle diameter] which is an index showing a spread of the particle size distribution has 0.6 or less.

When the particle size distribution has a broader range, there exist many fine particles having a particle diameter very smaller than its average particle diameter, or many particles having a particle diameter very larger than its average particle diameter (large particles) in the cathode active material. When a positive electrode is formed by using a cathode active material in which many fine particles exist, safety will be lowered since the fine particles generate heat due to its local reaction, and cycle characteristics will be lowered since the fine particles selectively deteriorate due to the heat. On the other hand, when a positive electrode is formed by using a cathode active material in which many large particles exist, since the area where the electrolytic solution is reacted with the cathode active material becomes insufficient, reaction resistance is increased, and therefore, the output of a battery is lowered.

In contrast, according to the present invention, since the value of [(d90−d10)/average particle diameter] which shows the spread of a particle size distribution of the cathode active material is controlled so that the value is 0.6 or less, the ratio of the fine particles and the large particles becomes lower, and therefore, a battery in which this cathode active material is used in the positive electrode is excellent in safety and has favorable cycle characteristics and battery output.

In addition, it is advantageous that the value of [(d90−d10)/average particle diameter] showing the spread of particle size distribution of the cathode active material is smaller from the viewpoint of improvement in performance of the cathode active material, and it is preferred that its lower limit is about 0.05 as to the cathode active material obtained in the present invention.

Incidentally, in the index of [(d90−d10)/average particle diameter], "d10" means a particle diameter at which an accumulated volume is 10% of the total volume of all particles when the numbers of particles having a specified particle diameter are accumulated from particles having a smaller particle diameter. Also, "d90" means a particle diameter at which an accumulated volume is 90% of the total volume of all particles when the numbers of particles having a specified particle diameter are accumulated from particles having a smaller particle diameter.

Methods for determining the average particle diameter, the value of "d90" and the value of "d10" are not particularly limited. The average particle diameter, the value of "d90" and the value of "d10" can be determined from, for example, volume-integrated values as measured by means of a laser diffraction scattering type particle size analyzer.

(Average Particle Diameter)

The particle diameter of the cathode active material of the present invention is from 2 to 8 μm, preferably from 3 to 8 μm, more preferably from 3 to 6 μm. When the average particle diameter is less than 2 μm, packing density of the battery capacity per volume of the positive electrode is lowered. When the average particle diameter exceeds 8 μm, since the specific surface area of the cathode active material is lowered, the area where the cathode active material is contacted with the electrolytic solution of a battery is decreased, and therefore, the resistance of the positive electrode is increased, and the output characteristics of a battery is lowered.

Accordingly, a battery in which the cathode active material of the present invention is used in the positive electrode has a large battery capacity per its volume, and also has excellent battery characteristics such as high safety and high power.

(Composition of Particles)

In the cathode active material of the present invention, the atomic ratio of lithium is within a range of from 0.95 to 1.15 in the above-mentioned general formula (II). When the ratio of lithium is smaller than the above-mentioned range, since the reaction resistance of the positive electrode increases in the nonaqueous electrolyte secondary battery in which the cathode active material is used, the output of the battery is lowered. When the ratio "t" of lithium is larger than the above-mentioned range, the reaction resistance of the positive electrode increases, as well as the initial discharge capacity of the cathode active material is lowered. It is more preferred that the atomic ratio "t" of lithium is from 1.0 to 1.15.

In addition, in the cathode active material of the present invention, cobalt may not be existed. However, in order to obtain better cycle characteristics, it is preferred that cobalt is contained in the cathode active material since expansion-contraction behavior of the crystal lattice, which is caused by the desorption or insertion of Li accompanying with charge and discharge can be reduced by substituting a part of Ni existing in the crystal lattice with cobalt. From the viewpoint as mentioned above, the atomic ratio "x" of cobalt is from 0 to 0.2, preferably from 0.08 to 0.2, and more preferably from 0.12 to 0.20. In addition, from the viewpoint of battery capacity and output characteristics, the atomic ratio of nickel to cobalt (Ni/Co) is preferably from 0.75/0.25 to 0.9/0.1, more preferably from 0.8/0.2 to 0.85/0.15, and particularly preferably 0.82/0.15.

In addition, as represented by the above-mentioned general formula (II), it is preferred that the cathode active material of the present invention contains an additive element since durability and output characteristics of a battery can be improved when the cathode active material of the present invention is used in the battery.

Moreover, it is preferred that the additive element is homogenously distributed on the surface or inside of the lithium-nickel composite oxide particles since lowering of the capacity can be inhibited, as well as durability characteristics and output characteristics of a battery can be improved in a small amount. Also, in order to be able to improve durability characteristics and output characteristics of a battery in a smaller amount and to inhibit the lowering of capacity, it is preferred that the amount of the additive element on the surface of the lithium-nickel composite oxide particles is greater than the amount of the additive element inside the lithium-nickel composite oxide particles.

Incidentally, it is not preferred that the atomic ratio "y" of the additive element "M" exceeds 0.15 since the metal elements which contribute to a Redox reaction decrease, and thereby battery capacity is lowered. Therefore, the lower limit of the atomic ratio "y" of the additive element "M" is 0, and preferably 0.001 or more from the viewpoint of inhibition of lowering of capacity as well as improvement in durability characteristics and output characteristics of a battery in a smaller amount.

(Process for Producing Cathode Active Material for Non-aqueous Electrolyte Secondary Battery)

The process for producing a cathode active material of the present invention is not particularly limited so long as a cathode active material can be produced so as to have the above-mentioned crystal structure, average particle diameter, particle size distribution and composition. It is preferred that the following process is employed since the cathode active material of the present invention can be produced more certainly.

Figure 3:
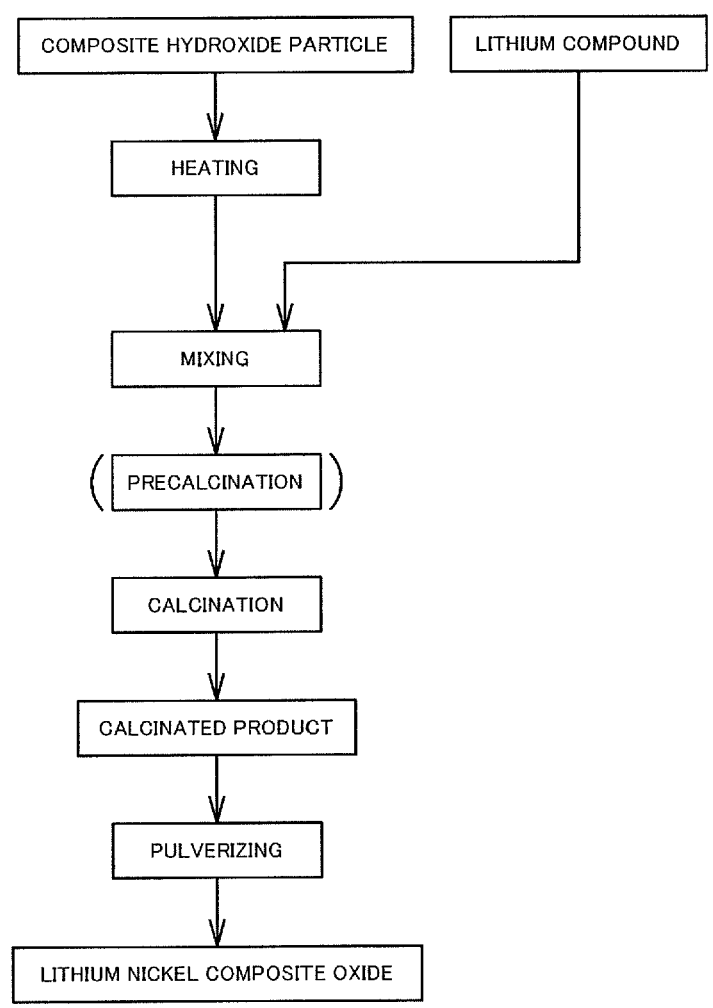
FIG. 3 is a schematic flow chart illustrating the steps for producing a lithium-nickel composite oxide from the nickel composite hydroxide of the present invention.

As shown in FIG. 3, the process for producing a cathode active material of the present invention includes (a) a step for heat-treating nickel composite hydroxide particles which are used as a source material of a cathode active material of the present invention, (b) a mixing step for mixing the particles after the above-mentioned heat-treatment with a lithium compound to form a mixture, and (c) a calcinating step for calcinating the mixture formed in the above-mentioned mixing step. The lithium-nickel composite oxide particles, that is, the cathode active material of the present invention can be obtained by pulverizing the sintered product.

The "pulverizing" means that a mechanical energy is applied to the aggregates including plural secondary particles, which are generated by sinter-necking or the like between the secondary particles during calcinating, to separating the secondary particles with each other with scarcely breaking of the secondary particles to loosen the aggregates.

Each step will be described below:

(a) Heat Treatment Step

The heat treatment step is a step for heating nickel composite hydroxide particles (hereinafter, simply referred to as composite hydroxide particles) to carry out a heat treatment, to remove moisture contained in the composite hydroxide particles. By carrying out this heat treatment step, the moisture contained in the composite hydroxide particles, which remains until a calcinating step can be reduced. In other words, since the composite hydroxide particles can be converted into composite oxide particles by this heat treatment step, the number of metal atoms and the ratio of the number of lithium atoms in the produced cathode active material can be prevented from variation.

Incidentally, there is no necessity to convert all of the composite hydroxide particles into composite oxide particles, since moisture has only to be removed to an extent which does not cause the variation of the number of atoms of metals and the ratio of the number of lithium atoms in the cathode active material.

In the heat treatment step, the composite hydroxide particles can be heated up to a temperature which enables to remove residual moisture. The temperature of the heat treatment is not particularly limited, and it is preferred that the temperature is 105° C. to 800° C. For example, when the composite hydroxide particles are heated to 105° C. or more, the residual moisture can be removed. Also, when the temperature of the heat treatment is less than 105° C., it tends to necessitate a longer period of time for removing the residual moisture. When the temperature of the heat treatment exceeds 800° C., the particles being converted into composite oxide may be aggregated by calcining.

When the heat treatment of the composite hydroxide particles is carried out, the atmosphere is not particularly limited, and the air is favorable since the heat treatment can be conveniently carried out.

In addition, the time period of the heat treatment for the composite hydroxide particles cannot be absolutely determined since the time period differs depending on the temperature during the heat treatment. The time period is preferably 1 hour or more, more preferably 5 to 15 hours since there is a possibility that the removal of residual moisture in the composite hydroxide particles cannot be sufficiently carried out when the time period is less than 1 hour. The equipment which is used in the heat treatment is not particularly limited, and any equipment which enables the composite hydroxide particles to be heated in the airflow is acceptable. There can be cited as the equipment, for example, an air dryer, an electric furnace which does not generate gas, and the like.

(b) Mixing Step

The mixing step is a step for mixing the particles obtained by heat-treating the composite hydroxide particles in the heat treatment step (hereinafter, referred to as heat treated particles) with a lithium compound, to give a lithium mixture.

Incidentally, the heat treated particles means nickel composite hydroxide particles from which residual moisture has been removed in the heat treatment step, nickel composite oxide particles which have been converted into oxide in the heat treatment step, or mixed particles thereof.

The ratio of the number of lithium atoms (Li) in the lithium mixture to the number of atoms of the metals other than lithium, that is, the sum of the number of the atoms of nickel, cobalt and additive elements (Me) (hereinafter, referred to as "Li/Me") is preferably from 0.95/1 to 1.15/1, more preferably from 1/1 to 1.1/1. More specifically, the mixing is carried out so that the ratio of Li/Me in the lithium mixture becomes the same as the ratio of Li/Me in the cathode active material of the present invention. This is because the ratio of Li/Me in this mixing step corresponds to the ratio of Li/Me in the cathode active material, since the Li/Me is unchanged before and after the calcining step.

Accordingly, the lithium compound is mixed with the heat-treated particles so that the ratio of Li/Me can be preferably from 0.95/1 to 1.15/1, more preferably from 1/1 to 1.1/1.

It is preferred that the lithium compound which is used for the formation of the lithium mixture is lithium hydroxide, lithium nitrate, lithium carbonate or a mixture thereof since they are readily available. In addition, from the viewpoint of facility of handling and stability of quality, lithium hydroxide is more preferable.

Incidentally, it is preferred that the lithium mixture is sufficiently mixed prior to calcinating. When the mixing is not sufficiently carried out, the variation of Li/Me will be caused between each particle, and therefore, there is a possibility that sufficient battery characteristics cannot be obtained.

When carrying out mixing, a conventional mixer can be used. There can be cited as the mixer, for example, a shaker mixer, Loedige mixer, JULIA mixer, V blender, and the like. The heat treated particles can be sufficiently mixed with a substance which contains lithium to an extent such that the external shape of the composite hydroxide particles is not destroyed.

(c) Calcinating Step

The calcinating step is a step for calcinating the lithium mixture obtained in the above-mentioned mixing step, to form a lithium-nickel composite oxide. When the lithium mixture is calcinated in the calcinating step, since lithium in the substance containing lithium is diffused in the heat treated particles, the lithium-nickel composite oxide is formed.

(Calcinating Temperature)

The calcinating temperature of the lithium mixture is from 700° C. to 850° C., preferably from 720° C. to 820° C.

When the calcinating temperature is less than 700° C., lithium is not sufficiently diffused in the heat treated particles. Therefore, excessive lithium and unreacted particles remain in the lithium mixture, and the crystal structure is not satisfactorily regulated, whereby sufficient battery characteristics cannot be obtained. On the other hand, when the calcinating temperature exceeds 850° C., there is a possibility that calcining will drastically occur between the heat treated particles, and that abnormal particles will be generated. Accordingly, there is a possibility that the shape of particles (shape of spherical secondary particles as described later) cannot be maintained since the particles become coarse when calcinating. Therefore, when a cathode active material is formed from the particles, a specific surface area will be lowered, thereby the resistance of a positive electrode will increase, and the capacity of a battery will be lowered.

(Calcinating Period of Time)

The calcinating period of time is preferably 3 hours or more, more preferably 6 to 24 hours. When the calcinating period of time period is less than 3 hours, there is a possibility that the generation of a lithium-nickel composite oxide is not sufficiently carried out.

(Precalcination)

When a lithium hydroxide, lithium carbonate or the like is used as the lithium compound, prior to the calcining at a temperature of 700° C. to 850° C., it is preferred that preheating is carried out at a temperature less than the calcining temperature and a temperature at which the lithium compound can be reacted with the heat-treated particles. When the lithium mixture is maintained at the temperature, lithium is sufficiently diffused in the heat treated particles, and thereby a uniform lithium-nickel composite oxide can be obtained. For example, when a lithium hydroxide is used, it is preferred that the preheating is carried out with maintaining the temperature at 400° C. to 550° C. for 1 to 10 hours or so.

As described above, when the concentration of the additive element "M" increases on the surface of the lithium-nickel composite oxide particles, the heat treated particles which are homogenously covered with the additive element on their surfaces can be used. The concentration of the additive element on the surface of the above-mentioned composite oxide particles can be increased by calcinating the lithium mixture containing the heat treated particles under appropriate conditions. More specifically, when the lithium mixture containing the heat treated particles covered with the additive element is calcinated at a lower calcinating temperature for a shorter calcinating period of time, lithium-nickel composite oxide particles having an increased concentration of the additive element "M" on the surface of the particles can be obtained.

When the lithium mixture containing the heat treated particles covered with the additive element is calcinated at a higher calcinating temperature for a longer calcinating period of time, lithium-nickel composite oxide particles having the additive element homogenously distributed in the particles can be obtained. In other words, intended lithium-nickel composite oxide particles can be obtained by controlling the components of the heat treated particles and calcinating conditions.

(Calcinating Atmosphere)

When calcinating is carried out, the atmosphere is preferably an oxidizable atmosphere, more preferably an atmosphere having an oxygen concentration of 18 to 100% by volume. When the oxygen concentration is less than 18% by volume, the nickel composite hydroxide particles contained in the heat treated particles cannot be sufficiently oxidized, and therefore, there is a possibility such that the crystallinity of the lithium-nickel composite oxide becomes insufficient. Accordingly, it is preferred that the calcinating of the lithium mixture is carried out in the air or in an oxygen flow. In consideration of the battery characteristics, it is preferred that the lithium mixture is calcinated in the oxygen stream.

The furnace used in the calcinating is not particularly limited, and any furnace which enables the lithium mixture to be heated in the air or in an oxygen flow can be used. Among the furnaces, an electric furnace which does not generate gas is preferred, and either a batch type furnace or a continuous type furnace can be used.

(3) Nickel Composite Hydroxide Particles

The nickel composite hydroxide, which is used in the nickel composite hydroxide particles of the present invention (hereinafter, simply referred to as "composite hydroxide particles of the present invention"), is represented by the general formula (I):

$$Ni_{1-x-y}Co_xM_y(OH)_{2+\alpha} \qquad (I)$$

wherein 0≤x 0.2, 0≤y≤0.15, x+y<0.3; 0≤α≤0.5, and M is at least one additive element selected from the group consisting of Mg, Al, Ca, Ti, V, Cr, Mn, Zr, Nb, Mo and W. The composite hydroxide particles of the present invention are spherical secondary particle formed by the aggregation of plural platelike primary particles. The secondary particles are ones which have an average particle diameter of 3 to 7 μm, and the index of [(d90−d10)/average particle diameter], which shows the spread of the particle size distribution, being 0.55 or less.

The composite hydroxide particles of the present invention are particularly suitable as a source material of the above-mentioned cathode active material of the present invention. Therefore, the composite hydroxide particles of the present invention are described below on the premise of the use of the composite hydroxide particles as a source material of the cathode active material of the present invention.

(Particle Structure)

The composite hydroxide particles of the present invention are spherical particles, and more specifically spherical secondary particles which are formed by the aggregation of plural platelike primary particles. Since the composite hydroxide particles of the present invention have the above structure, lithium is sufficiently distributed in the heat treated particles in the above-mentioned calcinating step for forming the cathode active material of the present invention.

Therefore, a favorable cathode active material having a uniform distribution of lithium is obtained.

It is preferred that the composite hydroxide particles of the present invention are ones which are formed by the aggregation of platelike primary particles in random directions. When the platelike primary particles are aggregated in random directions, voids are approximately uniformly formed between each primary particle. Therefore, when the primary particles are mixed with the lithium compound, and then calcinated, since the molten lithium compound distributes over the secondary particles, the diffusion of lithium is sufficiently carried out.

(Particle Size Distribution)

In the composite hydroxide particles of the present invention, the index of [(d90−d10)/average particle diameter] which shows the spread of particle size distribution is controlled to 0.55 or less. Since the particle size distribution of the cathode active material is significantly affected by the composite hydroxide particles which are used as a source material, when fine particles or coarse particles are contained in the composite hydroxide particles, particles similar to those particles are also existed in the cathode active material. Accordingly, the value of [(d90−d10)/average particle diameter] exceeds 0.55, and fine particles or coarse particles are also existed in the cathode active material. In the composite hydroxide particles of the present invention, since the value of [(d90−d10)/average particle diameter] is controlled to 0.55 or less, the particle size distribution of the cathode active material, which is prepared by using the composite hydroxide particles of the present invention as a source material, is narrowed, and therefore, its particle diameter is regulated. Therefore, the index of [(d90−d10)/average particle diameter] of the cathode active material being obtained can be controlled to 0.55 or less. Thereby, favorable cycle characteristics and output can be imparted to a battery having an electrode formed from the cathode active material which is prepared by using the composite hydroxide particles of the present invention as a source material.

(Average Particle Diameter)

The average particle diameter of the composite hydroxide particles of the present invention is 3 to 7 μm. Since the average particle diameter of the composite hydroxide particles of the present invention is 3 to 7 μm, the cathode active material, which is prepared by using the composite hydroxide particles of the present invention as a source material, usually has a given average particle diameter of 2 to 8 μm. When the average particle diameter of the composite hydroxide particles of the present invention is less than 3 μm, the average particle diameter of the cathode active material becomes small, and the packing density of a positive electrode is lowered. Therefore, the capacity of a battery per volume is lowered. On the other hand, when the average particle diameter of the composite hydroxide particles of the present invention exceeds 7 μm, since the specific surface area of the cathode active material is lowered, and the area where the cathode active material is contacted with the electrolytic solution is decreased, the resistance of the positive electrode is increased, to result in lowering of output characteristics of a battery. Since the composite hydroxide particles of the present invention have a given average particle diameter, a battery having a positive electrode formed by using the cathode active material of the present invention, which is prepared by using the composite hydroxide particles of the present invention as a source material, has excellent battery characteristics.

(Composition of Particles)

The nickel composite hydroxide particles which are used in the composite hydroxide particles of the present invention have a composition represented by the general formula (I). Therefore, a nickel composite hydroxide suited for a source material for producing a lithium-nickel composite oxide, which is a cathode active material, can be formed by using the composite hydroxide particles of the present invention. Moreover, when a lithium-nickel composite oxide is prepared by using this nickel composite hydroxide as a source material, and an electrode of which cathode active material is this lithium-nickel composite oxide is used in a battery, since the resistance of the positive electrode as determined can be lowered, output characteristics of the battery can be improved.

In addition, when a cathode active material is prepared by the above-mentioned process, the composition ratio (Ni:Co:M) of the composite hydroxide particles of the present invention is also maintained in the cathode active material. Accordingly, it is preferred that the composition ratio of the composite hydroxide particles of the present invention is controlled so that the composition ratio becomes the same as that of an intended cathode active material.

(Process for Producing Nickel Composite Hydroxide Particles)

The process for producing composite hydroxide particles of the present invention includes (a) a step for nucleation, which includes controlling the pH of an aqueous solution for nucleation containing a metal compound having an atomic ratio of metals corresponding to the atomic ratio of the metals in the nickel composite oxide particles and an ammonium ion donor to 12.0 to 13.4 at a liquid temperature of 25° C., to carry out nucleation, and (b) a step for growth of particles for growing the nuclei, which includes controlling the pH of the aqueous solution for growth of particles containing the nuclei obtained in the step for nucleation to 10.5 to 12.0 at a liquid temperature of 25° C.

In the process for producing composite hydroxide particles of the present invention, there is a characteristic in that the time at which the nucleation reaction is mainly carried out (a step for nucleation) is distinctly separated from the time at which the particle growth reaction is mainly carried out (step for growth of particles), although according to the conventional continuous crystallization method (see Patent Documents 2 and 3), the nucleation reaction is carried out at the same time of the particle growth reaction in the same vessel.

First of all, summary of the process for producing composite hydroxide particles of the present invention is explained below with reference to FIG. 1. Incidentally, in FIG. 1 and FIG. 2, the step (A) corresponds to the step for nucleation, and the step (B) corresponds to the step for growth of particles.

(Nucleation Step)

In the nucleation step as shown in FIG. 1, a solution for nucleation containing a metal compound having an atomic ratio of a metal corresponding to the atomic ratio of a metal in the particles of nickel composite hydroxide represented by the general formula (I) and an ammonium ion donor is prepared, to generate nuclei in this solution for nucleation. This solution for nucleation is prepared by mixing a mixed aqueous solution with an aqueous solution before reaction.

At first, as shown in FIG. 1, the mixed aqueous solution is prepared by dissolving plural metal compounds containing nickel in water in a specified ratio. At that time, the ratio of the metal compound which is dissolved in water is controlled so that the atomic ratio of each metal in the mixed aqueous solution becomes the same atomic ratio of metals in the particles of the nickel composite oxide represented by the general formula (I), to prepare a mixed aqueous solution.

On the other hand, the aqueous solution before reaction is prepared by supplying an aqueous alkali solution such as an aqueous sodium hydroxide solution, an aqueous ammonia solution containing an ammonium ion donor and water to a reaction vessel, and mixing them.

The pH of the aqueous solution is controlled to a range of 12.0 to 13.4 at a liquid temperature of 25° C. by adjusting the amount of an aqueous alkali solution being supplied. At the same time, the concentration of ammonium ion in the aqueous solution before reaction is controlled to 3 to 25 g/L. Also, the temperature of the aqueous solution before reaction is controlled to 20 to 60° C.

While stirring the aqueous solution before reaction of which temperature and pH are controlled in a reaction vessel, the above-mentioned mixed aqueous solution is supplied to the reaction vessel. As mentioned above, since the pH of the aqueous solution before reaction is controlled to a range of 12.0 to 13.4 at a liquid temperature of 25° C., when the aqueous solution before reaction is mixed with the mixed aqueous solution, an aqueous solution for nucleation is formed. Therefore, fine nuclei of the composite hydroxide are generated. At that time, since the pH of the aqueous solution for nucleation is within the above-mentioned range, the generated nuclei little grow, and the formation of nuclei is advantageously occurs.

Incidentally, during the formation of the nuclei, since the pH and concentration of ammonium ion of the aqueous solution for nucleation is changed, the mixed aqueous solution, the aqueous alkali solution and the aqueous ammonia solution are supplied to the aqueous reaction solution for nucleation, and thereby, the pH and the concentration of ammonium ion of the aqueous reaction solution for nucleation are maintained at a designated value.

As described in the above, when the mixed aqueous solution, the aqueous alkali solution and the aqueous ammonia solution are successively supplied to the aqueous solution for nucleation, new nuclei are successively and continuously generated in the aqueous solution for nucleation.

Subsequently, when the nuclei are produced in a specified amount in the aqueous solution for nucleation, the step for nucleation is terminated. Whether or not the nuclei are formed in a predetermined amount can be decided by the amount of the metal compound being added to the aqueous solution for nucleation.

(Particle Growth Step)

After the step for nucleation is completed, nuclei, which are generated in the step for nucleation, are grown up in an aqueous solution for growth of particles, the pH of which is controlled to 10.5 to 12.0 at a liquid temperature of 25° C. The aqueous solution for growth of particles can be obtained by supplying the aqueous solution for growth of particles after the step for nucleation with an acid or a metal salt solution, to control the pH to 10.5 to 12.0. One of characteristics of the present invention also resides in that the pH of the aqueous solution for growth of particles is controlled to a regulated range.

In the aqueous solution for growth of particles having a pH of 12.0 or less, the reaction for growth of nuclei is more advantageously proceeded than the reaction for generation of nuclei. Therefore, new nuclei would be little generated in the aqueous solution for growth of particles. When composite hydroxide particles having a specified particle diameter are generated in a specified amount, the step for growth of particles is terminated. The amount of the generated composite hydroxide particles having a specified particle diameter is determined by the amount of the metal compound which is added to the aqueous solution for nucleation.

As described in the above, according to the process for producing the composite hydroxide particles, nucleation preferentially occurs in the course of the step for nucleation, and the growth of nuclei little occurs in the course of the step for nucleation. In contrast, in the course of the step for growth of particles, only the growth of particles occurs, and new nuclei would be little generated. Therefore, uniform nuclei having a narrow range of particle size distribution can be formed by the step for nucleation. On the other hand, in the step for growth of particles, nuclei can be homogenously grown up. Therefore, according to the process for producing the composite hydroxide particles of the present invention, uniform nickel composite hydroxide particles having a narrow range of particle size distribution can be obtained.

Hereinafter, the process for nucleation is specifically described.

(A) Metal Compound

As a metal compound, a metal compound having an atomic ratio of a metal corresponding to the atomic ratio of a metal in the nickel composite hydroxide represented by the general formula (I). The metal compound comprises one or at least 2 kinds of metal compounds so that the metal compound has an atomic ratio of a metal corresponding to the atomic ratio of a metal in the nickel composite hydroxide represented by the general formula (I).

It is preferred that the metal compound is usually previously dissolved in water, in order to uniformly mix the metal compound with an ammonium ion donor. Accordingly, it is preferred that the metal compound has water solubility. Incidentally, the solution prepared by dissolving the metal compound in water corresponds to the aqueous mixed solution as shown in FIG. 1.

As the metal compound, there can be cited, for example, a salt of an inorganic acid, and the like. As the salt of an inorganic acid, one or at least 2 kinds of salts of an inorganic acid are used so that the salt of an inorganic acid has an atomic ratio of a metal corresponding to the atomic ratio of a metal in the nickel composite hydroxide represented by the general formula (I). As the salt of an inorganic acid, there can be cited, for example, a salt of nitric acid, a salt of sulfuric acid, a salt of chloric acid and the like, and the present invention is not limited to those exemplified ones. These salts of an inorganic acid can be used alone or in an admixture of at least 2 kinds. As preferred metal compounds, for example, nickel sulfate and cobalt sulfate can be cited.

(Additive Element)

In the general formula (I), "M" shows an additive element. The additive element is at least one element selected from the group consisting of Mg, Al, Ca, Ti, V, Cr, Mn, Zr, Nb, Mo and W. It is preferred that as a compound containing the additive element, a water soluble compound is used. The compound containing the additive element, there can be cited, for example, magnesium sulfate, aluminum sulfate, sodium aluminate, titanium sulfate, ammonium peroxotitanate, titanium potassium oxalate, vanadium sulfate, ammonium vanadate, chromium sulfate, potassium chromate, manganese sulfate, zirconium sulfate, zirconium nitrate, niobium oxalate, ammonium molybdate, sodium tungstate, ammonium tungstate and the like, and the present invention is not limited to those exemplified ones.

When the additive element is homogenously dispersed in the composite hydroxide particles, to the above-mentioned mixed solution can be added a compound having the additive element, preferably a compound having a water-soluble additive element. Thereby, the additive element can be homogenously dispersed in the composite hydroxide particles.

In addition, when the surface of the composite hydroxide particles is covered with the additive element, the surface can be covered with the additive element by, for example, preparing a slurry of the composite hydroxide particles with an aqueous solution containing a compound having the additive element, and precipitating the additive element on the surface of the composite hydroxide particles with a crystallization reaction. In this case, an alkoxide solution of a compound having the additive element may be used in place of the aqueous solution of a compound having the additive element. Furthermore, the surface of the composite hydroxide particles can be covered with the additive element by spraying an aqueous solution or slurry containing a compound having the additive element to the composite hydroxide particles followed by drying.

Incidentally, when the surface of the composite hydroxide particles is covered with the additive element, the ratio of the number of metal atoms in the compound having the additive element existing in the aqueous solution for nucleation can be agreed with the ratio of the number of metal atoms of the composite hydroxide particles by reducing the amount of the additive element in an amount which is necessary for covering the surface.

In addition, the step for covering the surface of the composite hydroxide particles with the additive element may be applied to the particles after heating the composite hydroxide particles, that is, to the heat treated particles as described above.

(B) Ammonium Ion Donor

In the ammonium ion donor, ammonium ion plays a role as a complexing agent. As the ammonium ion donor, there can be cited, for example, aqueous ammonia, ammonium sulfate, ammonium chloride, ammonium carbonate, ammonium fluoride and the like, and the present invention is not limited to those exemplified ones.

As the ammonium ion donor, aqueous ammonia is usually used. It is preferred that the concentration of ammonium ion in the solution for nucleation is 3 to 25 g/L. When the concentration of ammonium ion is less than 3 g/L, since the solubility of a metal ion cannot be maintained constant, platelike hydroxide primary particles having regulated shapes and particle diameters cannot be formed, and gelatinous nuclei are likely to be produced, so that the particle size distribution is apt to be broad. On the other hand, when the concentration of ammonium ion exceeds 25 g/L, since the solubility of the metal ion becomes too higher, and the amount of the metal ion existing in the solution for nucleation increases, fluctuation of the composition of the resulting nuclei will be generated. The concentration of ammonium ion can be determined by using an ion meter which has conventionally been used.

In addition, when the concentration of ammonium varies, the solubility of a metal ion varies, and therefore, hydroxide particles having homogeneous composition is not formed. Therefore, it is preferred that the concentration of ammonium is kept constant. Accordingly, it is preferred that the concentration of ammonium is controlled so that the difference of the lower limit and the upper limit exists within 5 g/L or so.

(C) Preparation of Aqueous Solution for Nucleation

An aqueous solution for nucleation can be prepared by mixing the metal compound with the ammonium ion donor. The mixing of the metal compound with the ammonium ion donor can be usually carried out by mixing the aqueous solution of the metal compound (the aqueous mixed solution as shown in FIG. 1) with the aqueous solution of the ammonium ion donor (the aqueous solution before reaction as shown in FIG. 1). Incidentally, the aqueous solution before reaction is mixed with an aqueous alkali solution as a pH control agent as described below.

(D) Concentration of a Metal Compound in the Aqueous Solution for Nucleation

It is preferred that the concentration of the metal compound in the aqueous solution for nucleation is from 1 to 2.2 mol/L. When the concentration of the metal compound in the aqueous solution for nucleation is less than 1 mol/L, although a crystallization reaction of the composite hydroxide particles can be carried out, the productivity is lowered since the amount of crystallized product decreases. On the other hand, when the concentration of the metal compound in the aqueous solution for nucleation exceeds 2.2 mol/L, there is a possibility such that crystals are precipitated, and thereby clogging is generated in a pipe of equipment. In addition, when at least two kinds of the metal compound are used, each aqueous solution of a metal compound may be prepared and mixed with each other in a desired ratio so that the concentration of the metal compound in the aqueous solution for nucleation is included within a predetermined range.

In addition, it is preferred that the amount of the nuclei in the aqueous solution for nucleation is about 30 to about 200 g/L. When the concentration of the nuclei in the aqueous solution for nucleation is less than 30 g/L, aggregation of the primary particles may be insufficient. When the concentration of the nuclei in the aqueous solution for nucleation exceeds 200 g/L, the particle growth may be biased.

(E) pH of the Aqueous Solution for Nucleation

The pH of the aqueous solution for nucleation is controlled to 12.0 to 13.4 at a liquid temperature of the aqueous solution for nucleation of 25° C. The present invention has one of characteristics in that the pH of the aqueous solution for nucleation is controlled to a specified range. Since the pH of the aqueous solution for nucleation is controlled as described above, the growth of nuclei is inhibited, and only nucleation can be predominately carried out. Therefore, the resulting nuclei become homogeneous and have a narrow particle diameter distribution range. Incidentally, when the pH is higher than 13.4 at the liquid temperature of 25° C., the resulting nuclei may become too fine, and the aqueous solution for nucleation is gelled. In the other hand, when the pH is less than 12.0 at the liquid temperature of 25° C., the growth reaction of the nuclei is generated along with the nucleation, and therefore, the range of particle size distribution of the resulting nuclei becomes broad and inhomogeneous. Accordingly, the pH of the aqueous solution for nucleation is from 12.0 to 13.4, preferably from 12.2 to 13.4.

The pH of the aqueous solution for nucleation can be controlled by using a pH control agent. As the pH control agent, there can be cited, for example, an aqueous alkali solution such as an aqueous solution of an alkali metal hydroxide such as sodium hydroxide or potassium hydroxide, and the pH control agent is not limited to those exemplified ones in the present invention. The pH of the aqueous solution for nucleation can be determined by using a pH meter which has been conventionally used. The pH control agent may be included in the ammonium ion donor.

The pH control agent may be added to the mixed aqueous solution, and it is preferred that the pH control agent is directly added to the aqueous solution for nucleation since the pH of the aqueous solution for nucleation is easily controlled. When the pH control agent is directly added to the aqueous solution for nucleation, the pH control agent may be added so that the pH of the aqueous solution for nucleation is maintained within a specified range by using a pump which enables the flow rate to be controlled while stirring the aqueous solution for nucleation.

Incidentally, in the progress of the nucleation, the pH of the aqueous solution for nucleation and the concentration and pH of the ammonium ion are changed. Therefore, it is desired that the pH of the aqueous solution for nucleation and the concentration and pH of the ammonium ion are controlled so that these are maintained within a specified range, respectively, by properly adding the aqueous solution of the ammonium ion donor and the pH control agent. For example, as shown in FIG. 1, the pH of the aqueous solution for nucleation and the concentration of the ammonium ion can be controlled so that these are maintained within a specified range, respectively, by supplying the aqueous solution for nucleation with the mixed aqueous solution.

(F) Amount of the Resulting Nuclei

The amount of the nuclei generated in the course of the step for nucleation is not particularly limited, and is preferably from 0.1 to 2% by mass of the metal compound, and more preferably from 0.1 to 1.5% by mass of the metal compound from the viewpoint of obtaining composite hydroxide particles having a proper particle diameter distribution.

(G) Temperature of the Aqueous Solution for Nucleation

The temperature of the aqueous solution for nucleation is preferably 20° C. or more, and more preferably 20° C. to 60° C. When the temperature of the aqueous solution for nucleation is less than 20° C., there is a tendency that nuclei are likely to generate, and that its control becomes difficult. When the temperature of the aqueous solution for nucleation exceeds 60° C., there is a necessity to use an excess amount of the ammonium ion donor in order to maintain the ammonium ion concentration to a specified range since ammonia is apt to volatile.

(H) Atmosphere in the Step for Nucleation

The atmosphere in the step for nucleation is not particularly limited, but excessively oxidizable atmosphere is not preferred from the viewpoint of stable growth of nuclei. Accordingly, it is desired that the atmosphere in the step for nucleation has an oxygen concentration less than that of the air. For example, when the step for nucleation is carried out in the atmosphere having an oxygen concentration of 10% or less by volume of the space of the reaction vessel, the unnecessary oxidization of particles can be suppressed, and therefore, particles having an even particle size can be obtained. The concentration of oxygen in the atmosphere can be controlled by using, for example, an inert gas such as nitrogen gas. As a means for controlling the concentration of oxygen in the atmosphere to a predetermined range, there can be cited, for example, there can be cited a method for constantly flowing an inert gas in the atmosphere.

(I) Manufacturing Facilities

In the step for nucleation, an apparatus, which does not collect a product until the reaction is completed, is used. As the apparatus, there can be cited, for example, a batch reaction vessel with which a stirrer is equipped, and the like. When such an apparatus is used, particles having a narrow particle size distribution and an even particle diameter can be easily obtained, since a problem such that growing particles are collected together with an overflowed liquid can be avoided as in the case where a general continuous crystallization apparatus for collecting a product by overflowing is used. In addition, when the reaction atmosphere is controlled, it is desired to use an apparatus which enables the control of the atmosphere, such as an enclosed apparatus. When such an apparatus is used, particles being excellent in particle diameter distribution (that is particles having a narrow range of particle size distribution) can be obtained, since the generation of nuclei almost evenly progresses.

Next, a particle growth step is specifically described below.

(A) pH of the Aqueous Solution for Particle Growth

The pH of the aqueous solution for particle growth is controlled so as to be 10.5 to 12.0 at a liquid temperature of 25° C. Therefore, nuclei are newly generated little in the aqueous solution for particle growth.

When the pH of the aqueous solution for particle growth is higher than 12.0, newly generated nuclei increase, and therefore, hydroxide particles having a favorable particle diameter distribution cannot be obtained. On the other hand, when the pH of the aqueous solution for particle growth is less than 10.5, a solubility increases due to the ammonium ion donor, and the amount of a metal ion remaining in a liquid unfavorably increases without extraction. Accordingly, the pH of the aqueous solution for particle growth at a liquid temperature of 25° C. is from 10.5 to 12.0, and preferably from 10.5 to 11.8.

Incidentally, it is a boundary condition between the nucleation and the growth of nuclear that the pH of the aqueous solution for growth of particles is 12 at a liquid temperature of 25° C. Therefore, any condition of the step for nucleation and the step for growth of particles can be selected on the basis whether or not the nuclei are existed in the aqueous solution for growth of nuclei.

When a large amount of nuclei are generated by controlling the pH in the step for nucleation to greater than 12 at a liquid temperature of 25° C., and thereafter controlling the pH in the step for growth of nuclei to 12 at a liquid temperature of 25° C., a large amount of nuclei exists in the aqueous solution for growth of particles. Therefore, the growth of nuclei occurs preferentially, and the above-mentioned hydroxide particles having a narrow particle diameter distribution and a comparatively large particle diameter is obtained. On the other hand, when the nuclei are in the condition where the nuclei are not existed in the aqueous solution for growth of particles, that is, the pH in the step for nucleation is controlled to 12 at a liquid temperature of 25° C., nuclei which grow up are not existed. Therefore, the nucleation preferentially occurs. Accordingly, the resulting nuclei grow up, and the above-mentioned favorable hydroxide particles are obtained by controlling the pH in the step for growth of particles to lower than 12 at a liquid temperature of 25° C.

In either case, the pH at a liquid temperature of 25° C. in the step for growth of particles may be controlled to a value lower than the pH at a liquid temperature of 25° C. in the step for nucleation. The difference of the pH of the aqueous solution for nucleation and the pH of the aqueous solution for growth of particles is preferably 0.5 or more, and more preferably 0.7 or more from the viewpoint of obtaining hydroxide particles having a narrow particle diameter distribution and a relatively large particle diameter.

(B) Preparation of Aqueous Solution for Growth of Particles

In the step for growth of particles, since composite hydroxide particles are crystallized, metal components and the like contained in the aqueous solution for growth of particles decrease. Therefore, the aqueous solution for growth of particles is provided with the mixed aqueous solution. When the ratio of water which is used as a solvent increases per the metal compound contained in the aqueous solution for growth of particles, the concentration of the mixed aqueous solution supplied to the aqueous solution for growth of particles is apparently decreases. Therefore, there is a possibility that composite hydroxide particles are not sufficiently grown up in the step for growth of particles.

Therefore, it is preferred that a part of the aqueous solution for nucleation or a part of the aqueous solution for growth of particles is discharged from the reaction vessel after the completion of the step for nucleation or in the course of the step for growth of particles. More specifically, the supply of the mixed aqueous solution and the like to the aqueous reaction solution for growth of particles and stirring are terminated, to settle down the nuclei or the composite hydroxide particles, and the supernatant of the aqueous solution for growth of particles is discharged. As a result, since the relative concentration of the mixed aqueous solution in the aqueous solution for growth of particles can be increased, the particle size distribution of the composite hydroxide particles can be more narrowed, and the density of the composite hydroxide particles can be increased. In addition, when the pH of the aqueous solution for nucleation is controlled to form the aqueous solution for growth of particles after the completion of the step for nucleation, the step for nucleation can be quickly shifted to the step for growth of particles.

Figure 2:
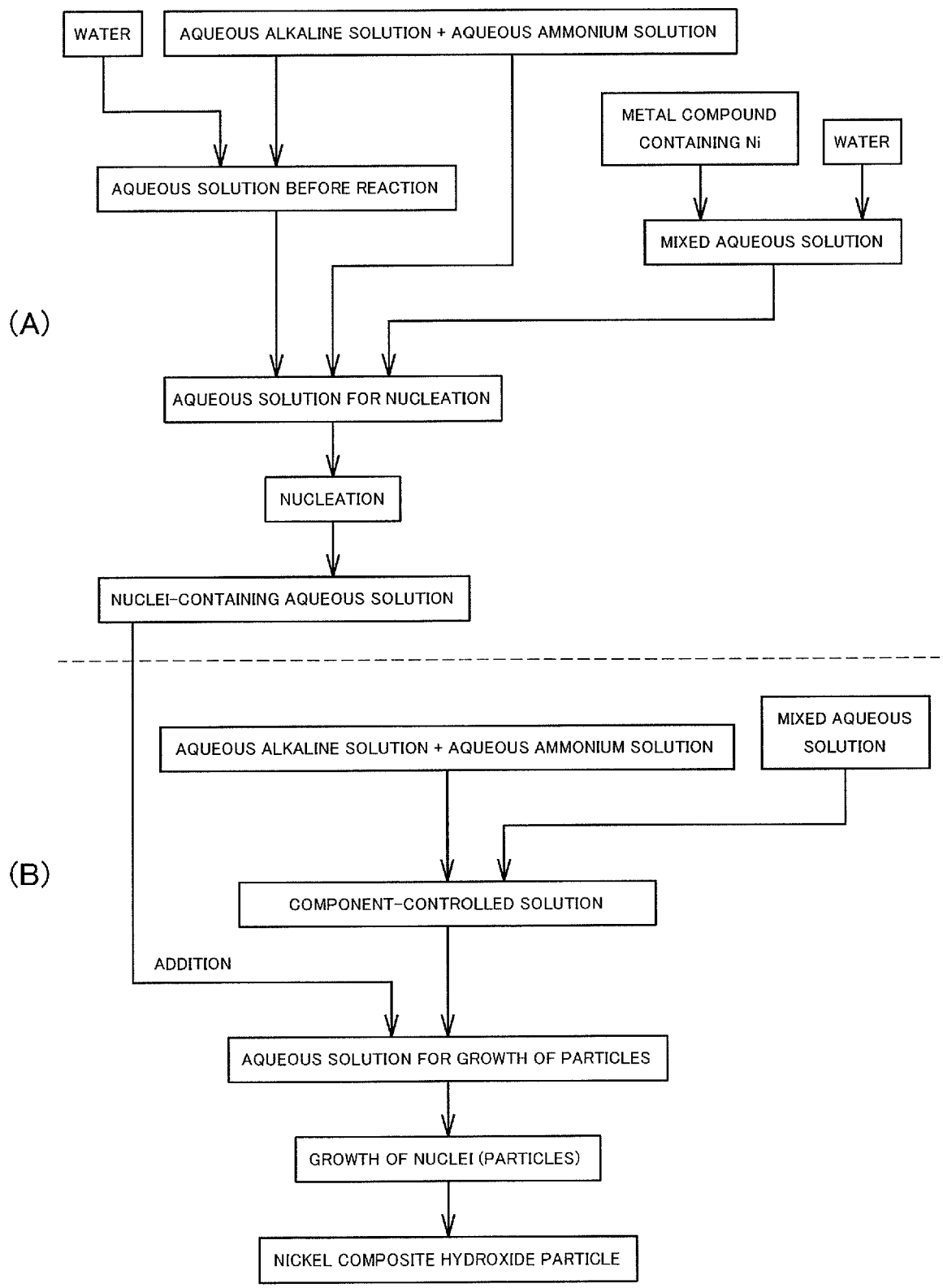
FIG. 2 is a schematic flow chart illustrating other steps for producing the nickel composite hydroxide of the present invention.

As shown in FIG. 2, the step for growth of particles can be carried out by preparing a quality governing aqueous solution in which the pH and the concentration of ammonium ion are controlled to a value which is suitable for the step for growth of particles apart from the aqueous solution for nucleation, adding an aqueous solution containing nuclei which is prepared by the step for nucleation in the other reaction vessel to this quality governing aqueous solution, to give an aqueous solution for growth of particles, and using the resulting aqueous solution for growth of particles. According to this process, since the step for nucleation is separated from the step for growth of particles, the conditions of the aqueous solution for nucleation and the aqueous solution for growth of particles can be controlled so that the condition is suited for each step. In addition, in the step for growth of particles, since the pH of the aqueous solution for growth of particles can be controlled so as to suite for the growth of particles from the beginning of the step for growth of particles, the range of the particle size distribution of nickel composite particles which are formed in the step for nucleation can be narrowed, and homogeneous particles can be formed.

Also, when the aqueous solution for growth of particles is prepared by controlling the pH of the aqueous solution for nucleation, since the step for growth of particles can be continuously carried out from the step for nucleation, the step for nucleation can be shifted to the step for growth of particles only by controlling the pH of the aqueous solution for nucleation. In other words, the step for nucleation can be easily shifted to the step for growth of particles by temporarily terminating the use of the pH control agent which is used in the aqueous solution for nucleation.

Incidentally, the pH of the aqueous solution for nucleation and the aqueous solution for growth of particles can be controlled by using a pH control agent. The pH control agent includes, for example, inorganic acids such as sulfuric acid, chloric acid and nitric acid, and the like. Among the inorganic acids, it is preferred that the inorganic acid which is the same as the acid which constitutes the starting material, metal compound, for example, sulfuric acid in case of a salt of sulfuric acid.

(C) Controlling of Particle Diameter of Composite Hydroxide Particles

The particle diameter of the composite hydroxide particles can be controlled by controlling the time period for carrying out the step for growth of particles. Accordingly, composite hydroxide particles having a desired particle diameter can be obtained by carrying out the step for growth of particles until the particles grow up to a desired particle diameter. Incidentally, the particle diameter of the composite hydroxide particles can be controlled not only by the step for growth of particles, but also by controlling the pH and the amount of the metal compound used in the step for nucleation. For example, when the amount of the metal compound is increased, and the number of the resulting nuclei is increased by increasing the pH in the course of nucleation or by prolonging the time period of the nucleation, the particle diameter of the resulting composite hydroxide particles can be reduced. On the other hand, when the step for nucleation is carried out so that the amount of the resulting nuclei is decreased, the particle diameter of the resulting composite hydroxide particles can be increased.

(D) Other Conditions

The difference between the step for nucleation and the step for growth of particles resides in that the pH regulated in the step for nucleation is different from the pH regulated in the step for growth of particles. Conditions such as the metal compound, concentration of ammonium ion, reaction temperature and atmosphere are substantially the same in these steps.

EXAMPLES

Hereinafter, working examples of the present invention will be more specifically described. However, the present invention is not limited to those working examples.

The average particle diameter and the particle size distribution of a composite hydroxide and a cathode active material, which are obtained in each example and each comparative example, and the performance (initial discharge capacity, cycle capacity retention rate and resistance of positive electrode) of a secondary battery were determined by the following methods:

(Measurement of Average Particle Diameter and Particle Size Distribution)

The average particle diameter and the particle size distribution (a value of: [(d90−d10)/average particle diameter]) of a composite hydroxide and a cathode active material are calculated from the volume-integrated value determined by using a laser diffraction scattering type particle size distribution measurement apparatus (manufactured by Nikkiso Co., Ltd. under the trade name of Microtrack HRA).

In addition, a crystal structure of a composite hydroxide and a cathode active material were determined by means of an X-ray diffraction measurement apparatus (PANalytical Ltd. under the trade name of X 'Pert PRO), and the compositions of the obtained composite hydroxide and cathode active material were determined by an ICP atomic emission spectrometry method after dissolving a sample in an amount of 1 g in 100 mL of purified water.

(Production of Secondary Battery)

Figure 8:
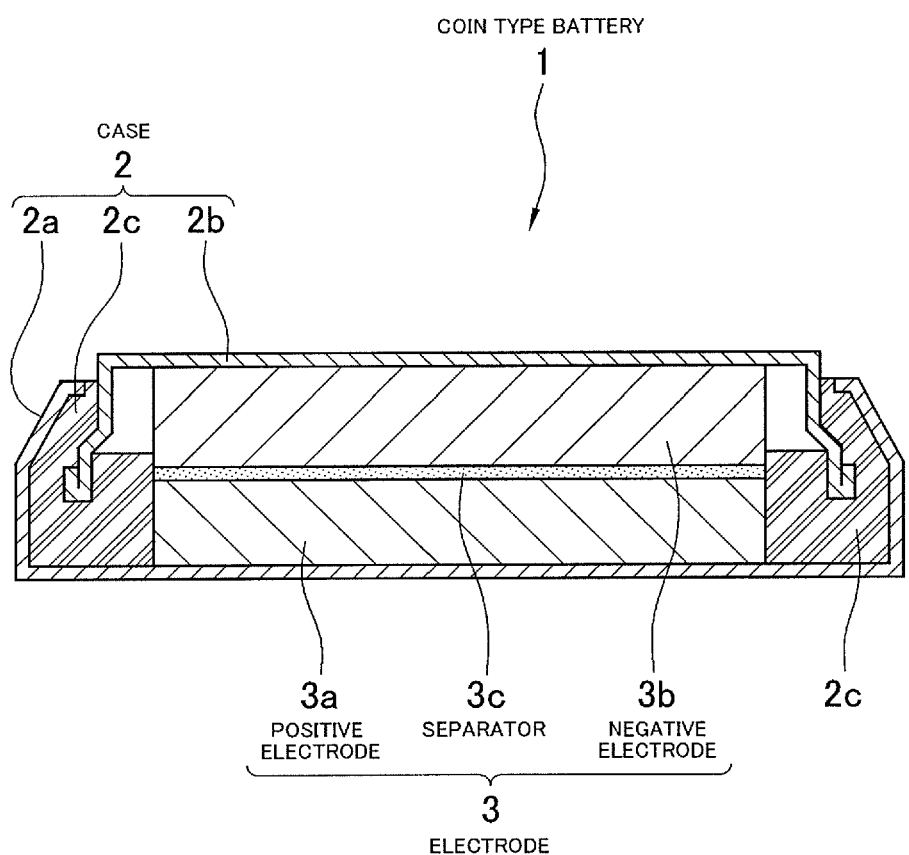
FIG. 8 is a schematic cross sectional view illustrating a coin-type battery which was used for evaluating a battery.

A 2032-type coin battery as shown in FIG. 8 (hereinafter, referred to as coin-type battery 1) was used for evaluating the performance of a secondary battery.

As shown in FIG. 8, the coin-type battery 1 is composed of a case 2, and an electrode 3 accommodated in this case 2.

The case 2 has a hollow and one-end opened positive electrode can 2a and a negative electrode can 2b placed at the opening of this positive electrode can 2a, and constructed so that a space for accommodating the electrode 3 between the negative electrode can 2b and the positive electrode can 2a when the negative electrode can 2b is positioned at the opening of the positive electrode can 2a.

The electrode 3 is composed of a positive electrode 3a, a separator 3c and negative electrode 3b, and those are laminated so as to align in this order. The positive electrode 3a is contacted with the inner face of the positive electrode can 2a, and the negative electrode 3b is accommodated in the case 2 so that the negative electrode 3b is contacted with the inner face of the negative electrode can 2b.

Incidentally, the case 2 is provided with a gasket 2c, and the relative movements of the positive electrode can 2a and the negative electrode can 2b is inhibited by this gasket 2c with the keeping of the state of contactless of the positive electrode can 2a and the negative electrode can 2b. In addition, the gasket 2c also has a function to seal the gap between the positive electrode can 2a and the negative electrode can 2b so as to shut the gap between the inside of the case 2 and the exterior in the air-tight and liquid-tight state.

The coin-type battery 1 as described above was produced by the following method.

First of all, 52.5 mg of a cathode active material for a nonaqueous electrolyte secondary battery, 15 mg of acetylene black and 7.5 mg of a polytetrafluoroethylene resin (PTFE) were mixed together, and the resulting mixture was subjected to press molding at a pressure of 100 MPa so as to have a diameter of 11 mm and a thickness of 100 μm, to produce a positive electrode 3a. The produced positive electrode 3a was dried in a vacuum drier at 120° C. for 12 hours.

A coin-type battery 1 as described above was produced by using this positive electrode 3a, a negative electrode 3b, a separator 3c and an electrolytic solution in a glove box having an argon atmosphere in which a dew point was controlled to −80° C. As the negative electrode 3b, there was used an electrode sheet which was produced by punching a copper foil to a discoid shape having a diameter of 14 mm, and coated with graphite powders having an average particle diameter of about 20 μm and polyvinylidene fluoride. Also, as the separator 3b, a polyethylene porous membrane having a film thickness of 25 μm was used. As the electrolytic solution, a mixed solution prepared by mixing ethylene carbonate (EC) with diethyl carbonate (DEC) in an equal amount, in which 1 M LiClO$_4$ was used as a supporting electrolyte (manufactured by Tomiyama Pure Chemical Industries, Limited).

The initial discharge capacity, the cycle capacity retention rate and the positive electrode resistance for evaluating performance of the produced coin-type battery 1 were defined as follows:

The initial discharge capacity was determined by allowing to stand the coin-type battery 1 for about 24 hours, and an electric current density of 0.1 mA/cm$^2$ for the positive electrode was charged up to a cut-off voltage of 4.3 V after an open circuit voltage (OCV) was stabilized. After the application of voltage was stopped for one hour, the capacity when electric discharge was carried out to a cut-off voltage of 3.0 V was regarded as an initial discharge capacity.

As to the cycle capacity retention rate, a cycle comprising carrying out the electric charge up to 4.2 V under the condition of a current density of 2 mA/cm$^2$ and carrying out the electric discharge to 3.0 V was repeated 500 times. The ratio of the discharge capacity after the repeat of charge and discharge to the initial discharge capacity was calculated and its ratio was regarded as a capacity retention rate. When the capacity of charge and discharge was determined, a multi-channel voltage/electric current generator (manufactured by Advantest Corporation under the trade name of R6741A) was used.

Figure 9:
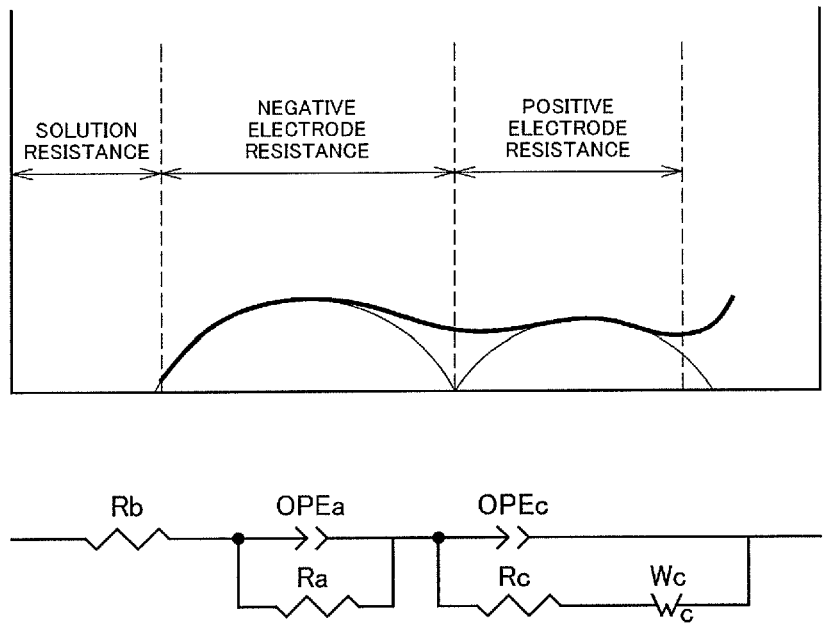
FIG. 9 is a schematic explanatory drawing illustrating an example of measurement for the evaluation of impedance and an equivalent circuit which was used for analysis.

In addition, when the positive electrode resistance was determined by charging the coin-type battery 1 at a charging potential of 4.1 V by means of frequency response analyzer and Potentio/Galvanostat (manufactured by Solartron under the product number of 1255B) in accordance with an alternating current impedance method, a Nyquist plot was obtained as shown in FIG. 9.

The resistance of the positive electrode resistance was determined by carrying out a fitting calculation with an equivalent circuit based on this Nyquist plot.

Incidentally, when composite hydroxides, cathode active materials and secondary batteries were produced in the working examples, special grade chemicals manufactured by Wako Pure Chemical Industries, Ltd. were used.

Example 1

(Step for Producing Composite Hydroxide)

The composite hydroxides were prepared by carrying out the following methods in accordance with the method according to the present invention.

First of all, a reaction vessel having a volume of 34 L was charged with water in a half amount of the volume of the reaction vessel. Thereafter, while stirring the water, the temperature in the reaction vessel was controlled to 40° C., and nitrogen gas was introduced into the reaction vessel to form a nitrogen atmosphere in the reaction vessel. At that time, the concentration of oxygen in the space of the reaction vessel was 2.0% by volume.

A 25% aqueous sodium hydroxide solution and a 25% aqueous ammonia were added into water in the reaction vessel in appropriate amounts, and an aqueous solution before the reaction in the vessel was adjusted to have a pH of 12.6 in terms of the pH as measured at a liquid temperature of 25° C. as a standard. Additionally, the ammonia concentration in the aqueous solution before the reaction was adjusted to 15 g/l.

(Step for Nucleation)

Next, nickel sulfate and cobalt sulfate were dissolved in water to give a 1.8 mol/L mixed aqueous solution. In this mixed aqueous solution, the molar ratio of each metal element was controlled so that Ni:Co became 0.82:0.15.

The above-mentioned mixed aqueous solution was added to the reaction mixture in the reaction vessel at a rate of 88 ml/min. At the same time, a 25% aqueous ammonia and a 25% aqueous sodium hydroxide solution were also added to the reaction mixture in the reaction vessel at a constant rate, and nucleation was carried out by carrying out the crystallization for 2 minutes and 30 seconds while the concentration of ammonium ion in the resulting aqueous solution for nucleation was maintained to the above-mentioned value, and while the pH was controlled to 12.6 (pH for nucleation).

(Step for Particle Growth)

Thereafter, supply of only the 25% aqueous sodium hydroxide solution was stopped until the pH of the aqueous solution for nucleation became 11.6 (pH for growth of particles) at a liquid temperature of 25° C., to give an aqueous solution for growth of particles.

After the pH of the aqueous solution for growth of particles was attained to 11.6 of a pH as measured at a liquid temperature of 25° C., supply of the 25% sodium hydroxide aqueous solution was restarted to grow up the particles for 2 hours under the control of the pH to 11.6.

The supply of the aqueous sodium hydroxide solution was terminated, and stirring was also terminated, to allow to stand when the reaction vessel was filled with the solution in order to accelerate the settling of a product. Then, after a half aliquot of the supernatant was drawn out from the reaction vessel, the supply of the aqueous sodium hydroxide solution was restarted, that crystallization was carried out for 2 hours (for 4 hours in total), to terminate the growth of particles. Thereafter, the resulting product was washed with water, filtrated and dried, to collect particles.

The resulting particles were transferred to another reaction vessel and mixed with water at room temperature, to give a mixed aqueous solution as a slurry. An aqueous solution of sodium aluminate and sulfuric acid were added to this mixed aqueous solution while stirring so that the slurry was adjusted to have a pH of 9.5. Thereafter, the surface of nickel-cobalt composite hydroxide particles was covered with aluminum hydroxide by continuing the stirring for 1 hour. At that time, the aqueous solution of sodium aluminate was added to the mixed aqueous solution so that the molar ratio of the metal elements in the slurry was satisfied with Ni:Co:Al=0.82:0.15:0.03.

After the stirring was terminated, the aqueous solution was filtered and the particles which were covered with the aluminum hydroxide were washed with water, to obtain a composite hydroxide. The resulting composite hydroxide was chemically analyzed. A result, its composition had $Ni_{0.82}Co_{0.15}Al_{0.03}(OH)_{2+\alpha}$ ($0 \leq \alpha \leq 0.5$). When the particle size distribution of this composite hydroxide particles were determined, as shown in FIG. 5, the average particle diameter was 4.4 μm, and the value of [(d90−d10)/average particle diameter] was 0.49.

From an SEM photograph (FIG. 6) which showed the results of observation of the obtained composite hydroxide particles with an SEM (manufactured by Hitachi High-Technologies Corporation under the trade name of scanning electron microscope S-4700), it was confirmed that the obtained composite hydroxide particles were nearly spherical, and their particle diameter were almost even.

(Step for Producing Cathode Active Material)

The above-mentioned composite hydroxide particles were thermally treated in the air flow (concentration of oxygen: 21% by volume) at a temperature of 700° C. for 6 hours, to give composite oxide particles.

Lithium hydroxide was weighed so that the ratio of Li/Me became 1.02, and this lithium hydroxide was mixed with the composite oxide particles obtained in the above, to give a mixture. The mixing was carried out by using a shaker-mixer apparatus (manufactured by Willy A Bachofen (WAB) AG under the trade name of TURBULA Type T2C).

Thus resulting mixture was calcined in an oxygen flow (concentration of oxygen: 100% by volume) at 500° C. for 4 hours, and thereafter calcinated at 730° C. for 24 hours. Thereafter, the mixture was cooled, and pulverized, to give a cathode active material.

As shown in FIG. 5, the particle size distribution of the obtained Cathode active material was determined. As a result, the average particle diameter was 4.5 μm, and the value of [(d90−d10)/average particle diameter] was 0.56.

In addition, an SEM observation of the cathode active material was carried out in the same manner as in the case of the composite hydroxide particles. As a result, as is clear from the SEM photograph (FIG. 7), it was confirmed that the obtained cathode active material was nearly spherical, and had an almost even particle diameter.

In addition, the obtained cathode active material was analyzed as determined by a powder X-ray diffraction analysis with a Cu-Kα ray. As a result, it was confirmed that the positive-electrode active was composed only of a hexagonal layered crystal of lithium-nickel-cobalt composite oxide.

Also, the cathode active material was chemically analyzed. As a result, it was confirmed that the cathode active material had a composition containing Li of 7.42% by mass, Ni of 50.4% by mass, Co of 9.24% by mass and Al of 0.97% by mass, which showed that the cathode active material had a composition of $Li_{1.017}Ni_{0.82}Co_{0.15}Al_{0.03}O_2$.

(Evaluation of Battery)

A charge and discharge test of a coin-type battery 1 having a positive electrode which was formed by using the cathode active material was carried out. As a result, as shown in FIG. 5, the initial discharge capacity of the coin-type battery 1 was 190.7 mAh/g, the discharge capacity after 500 cycles was 154.7 mAh/g, and the capacity retention rate was 82%. In addition, the resistance of the positive electrode was 3.8Ω.

With regard to Examples 2 to 11 and Comparative Examples 1 to 5 as mentioned below, only the substances and conditions which were changed from the above-mentioned Example 1 are shown. In addition, the results of each evaluation of Examples 2 to 11 and Comparative Examples 1 to 5 are shown in FIG. 5.

Example 2

A cathode active material for a nonaqueous electrolyte secondary battery was obtained in the same manner as in Example 1 except that lithium hydroxide was mixed with the composite oxide particles so that Li/Me became 1.06 (molar ratio). The performance of the obtained cathode active material for a nonaqueous electrolyte secondary battery was examined in the same manner as in Example 1.

In addition, it was confirmed by a chemical analysis that the obtained cathode active material had a composition containing Li of 7.62% by mass, Ni of 49.8% by mass, Co of 9.15% by mass and Al of 0.97% by mass, which showed that the cathode active material had a composition of $Li_{1.056}Ni_{0.82}Co_{0.15}Al_{0.03}O_2$, and had a crystal structure of a hexagonal system as determined by a powder X-ray diffraction.

Example 3

In the step for production of composite hydroxide particles, a mixed aqueous solution was prepared so that the ratio of Ni:Co:Al of the metal elements became 0.83:0.16:0.01 in a molar ratio. A cathode active material for a nonaqueous electrolyte secondary battery was obtained in the same manner as in Example 1 except that the step for nucleation was carried out so that the pH of the obtained mixed aqueous solution became 12.8 at 25° C., and that covering of aluminum hydroxide was not carried out after the nucleation. The performance of the obtained cathode active material for a nonaqueous electrolyte secondary battery was examined in the same manner as in Example 1.

In addition, it was confirmed by a chemical analysis that the obtained cathode active material had a composition containing Li of 7.38% by mass, Ni of 50.7% by mass, Co of 9.76% by mass and Al of 0.97% by mass, which showed that the cathode active material had a composition of $Li_{1.021}Ni_{0.83}Co_{0.16}Al_{0.01}O_2$, and had a crystal structure of a hexagonal system as determined by a powder X-ray diffraction.

Example 4

A cathode active material for a nonaqueous electrolyte secondary battery was obtained in the same manner as in Example 1 except that the concentration of ammonium ion was controlled to 10 g/L in the step for producing composite hydroxide, and that the reaction time period was controlled to 30 seconds in the step for nucleation. The performance of the obtained cathode active material for a nonaqueous electrolyte secondary battery was examined in the same manner as in Example 1.

In addition, it was confirmed by a chemical analysis that the obtained cathode active material had a composition containing Li of 7.41% by mass, Ni of 50.2% by mass, Co of 9.23% by mass and Al of 0.96% by mass, which showed that the cathode active material had a composition of $Li_{1.019}Ni_{0.82}CO_{0.15}Al_{0.03}O_2$, and had a crystal structure of a hexagonal system as determined by a powder X-ray diffraction.

Example 5

A composite hydroxide was obtained in the same manner as in Example 1 except that the mixed aqueous solution was prepared so that the molar ratio of metal elements of Ni:Co:Ti became 0.82:0.15:0.01, that crystallization was carried out in the step for producing composite hydroxide, and that covering of aluminum hydroxide was carried out so that the molar ratio Ni:Co:Ti:Al became 0.82:0.15:0.01:0.02. The performance of the obtained cathode active material for a nonaqueous electrolyte secondary battery was examined in the same manner as in Example 1.

In addition, a cathode active material for a nonaqueous electrolyte secondary battery was obtained in the same manner as in Example 1 except that the temperature for heat treatment was controlled to 550° C. and that the calcinating temperature was controlled to 745° C. in the step for producing a cathode active material by using the obtained composite hydroxide. The performance of the obtained cathode active material for a nonaqueous electrolyte secondary battery was examined in the same manner as in Example 1.

In addition, it was confirmed by a chemical analysis that the obtained cathode active material had a composition containing Li of 7.40% by mass, Ni of 50.2% by mass, Co of 9.21% by mass, Al of 0.6% by mass and Ti of 0.5% by mass, which showed that the cathode active material had a composition of $Li_{1.021}Ni_{0.82}Co_{0.15}Al_{0.02}Ti_{0.01}O_2$, and had a crystal structure of a hexagonal system as determined by a powder X-ray diffraction.

Example 6

A composite hydroxide was obtained in the same manner as in Example 1 except that the mixed aqueous solution was prepared so that the molar ratio of the metal elements of Ni:Co:Zr became 0.82:0.15:0.005, that crystallization was carried out in the step for producing composite hydroxide, and that covering of aluminum hydroxide was carried out so that the molar ratio of Ni:Co:Zr:Al became 0.82:0.15:0.005:0.025.
A cathode active material for a nonaqueous electrolyte secondary battery was obtained and in the same manner as in Example 1 except that the temperature for heat treatment was controlled to 550° C., and that the calcinating temperature was controlled to 745° C. in the step for producing a cathode active material by using the obtained composite hydroxide. The performance of the obtained cathode active material for a nonaqueous electrolyte secondary battery was examined in the same manner as in Example 1.

In addition, it was confirmed by a chemical analysis that the obtained cathode active material had a composition containing Li of 7.35% by mass, Ni of 49.9% by mass, Co of 9.17% by mass, Zr of 0.50% by mole and Al of 0.7% by mass, which showed that the cathode active material had a composition of $Li_{1.021}Ni_{0.82}Co_{0.15}Zr_{0.005}Al_{0.025}O_2$, and had a crystal structure of a hexagonal system as determined by a powder X-ray diffraction.

Example 7

A composite hydroxide was obtained in the same manner as in Example 1 except that the mixed aqueous solution was prepared so that the molar ratio of the metal elements of Ni:Co:W became 0.82:0.15:0.005, that crystallization was carried out in the step for producing composite hydroxide, and that covering of aluminum hydroxide was carried out so that the molar ratio of Ni:Co:W:Al became 0.82:0.15:0.005:0.025.

A cathode active material for a nonaqueous electrolyte secondary battery was obtained in the same manner as in Example 1 except that the temperature for heat treatment was controlled to 550° C., and that the calcinating temperature was controlled to 745° C. The performance of the obtained cathode active material for a nonaqueous electrolyte secondary battery was examined in the same manner as in Example 1.

In addition, it was confirmed by a chemical analysis that the obtained cathode active material had a composition containing Li of 7.34% by mass, Ni of 49.8% by mass, Co of 9.15% by mass, W of 0.93% by mass and Al of 0.69% by mass, which showed that the cathode active material had a composition of $Li_{1.022}Ni_{0.82}Co_{0.15}W_{0.005}Al_{0.025}O_2$, and had a crystal structure of a hexagonal system as determined by a powder X-ray diffraction.

Example 8

A composite hydroxide was obtained in the same manner as in Example 1 except that the metal salt solution was prepared so that the molar ratio of the metal elements of Ni:Co:Ti became 0.82:0.15:0.03, that crystallization was carried out in the step for producing composite hydroxide, and that covering of aluminum hydroxide was not carried out.

A cathode active material for a nonaqueous electrolyte secondary battery was obtained in the same manner as in Example 1 except that the temperature for heat treatment was controlled to 400° C., and mixing was carried out so that Li/Me became 1.06, and that the calcinating temperature was controlled to 760° C. in the step for producing a cathode active material by using the obtained composite hydroxide. The performance of the obtained cathode active material for a nonaqueous electrolyte secondary battery was examined in the same manner as in Example 1.

In addition, it was confirmed by a chemical analysis that the obtained cathode active material had a composition containing Li of 7.60% by mass, Ni of 49.7% by mass, Co of 9.16% by mass and Ti of 1.52% by mass, which showed that the cathode active material had a composition of $Li_{1.059}Ni_{0.82}Co_{0.15}Ti_{0.03}O_2$, and had a crystal structure of a hexagonal system as determined by a powder X-ray diffraction.

Example 9

A composite hydroxide was obtained in the same manner as in Example 1 except that the mixed aqueous solution was prepared so that the molar ratio of the metal elements of Ni:Co:Mn became 0.8:0.1:0.1, that crystallization was carried out in the step for producing composite hydroxide, and that covering of aluminum hydroxide was not carried out.

A cathode active material for a nonaqueous electrolyte secondary battery was obtained in the same manner as in Example 1 except that the temperature for heat treatment was controlled to 550° C., that lithium hydroxide was mixed so that Li/Me became 1.10, and that the calcinating temperature was controlled to 800° C. in the step for producing a cathode active material by using the obtained composite hydroxide. The performance of the obtained cathode active material for a nonaqueous electrolyte secondary battery was examined in the same manner as in Example 1.

In addition, it was confirmed by a chemical analysis that the obtained cathode active material had a composition containing Li of 7.84% by mass, Ni of 47.9% by mass, Co of 6.15% by mass and Mn of 5.79% by mass, which showed that the cathode active material had a composition of $Li_{1.101}Ni_{0.80}Co_{0.10}Mn_{0.10}O_2$, and had a crystal structure of a hexagonal system as determined by a powder X-ray diffraction.

Example 10

A cathode active material for a nonaqueous electrolyte secondary battery was obtained in the same manner as in Example 1 except that the temperature in the reaction vessel was controlled to 50° C., that the concentration of ammonium ion was controlled to 20 g/l, that the pH was controlled to 13.2 at a liquid temperature of 25° C., and that the nucleation was carried out for 30 seconds in the step for producing composite hydroxide. The performance of the obtained cathode active material for a nonaqueous electrolyte secondary battery was examined in the same manner as in Example 1.

In addition, it was confirmed by a chemical analysis that the obtained cathode active material had a composition containing Li of 7.43% by mass, Ni of 50.2% by mass, Co of 9.20% by mass and Al of 0.95% by mass, which showed that the cathode active material had a composition of $Li_{1.022}Ni_{0.82}Co_{0.14}Al_{0.03}O_2$, and had a crystal structure of a hexagonal system as determined by a powder X-ray diffraction.

Example 11

A small-size reaction vessel having a volume of 5 L was charged with water in a half amount of the volume of the reaction vessel, and the temperature in the reaction vessel was controlled to 40° C. while stirring. A 25% aqueous sodium hydroxide solution and a 25% aqueous ammonia were added thereto in a proper amount so that the pH of the reaction mixture in the reaction vessel became 12.6 at a liquid temperature of 25° C., and that the concentration of ammonium ion in the reaction mixture became 10 g/L.

Next, a 1.8 mol/L mixed aqueous solution prepared by dissolving nickel sulfate and cobalt sulfate (molar ratio of metal elements of Ni:Co=0.82:0.15), a 25% aqueous ammonia, and a 25% aqueous sodium hydroxide solution were added to the above-mentioned reaction mixture at a constant rate so that the concentration of ammonium ion in the obtained aqueous solution for nucleation had the above-mentioned value, and the aqueous sodium hydroxide solution was added for 2 minutes and 30 seconds while the pH was controlled to 12.6 (pH for nucleation), to give seed crystals.

Another reaction vessel having a volume of 34 L was charged with water in a half amount of the volume of the reaction vessel. While stirring the water, the temperature in the reaction vessel was controlled to 40° C., and nitrogen gas was introduced into the reaction vessel to form a nitrogen atmosphere in the reaction vessel. At that time, the concentration of oxygen in the space of the reaction vessel was 2.0% by volume.

To the water in this reaction vessel were added a 25% aqueous sodium hydroxide solution and a 25% aqueous ammonia in a proper amount, to control the pH of the reaction mixture in the reaction vessel to 11.6 at a liquid temperature of 25° C. In addition, the concentration of ammonium ion in the reaction mixture was controlled to 10 g/L. The reaction mixture containing the seed crystals obtained in the above-mentioned small-size reaction vessel was added to the reaction vessel, and thereafter, under the condition that the concentration of ammonium ion in the aqueous solution for nucleation was maintained to the above-mentioned value, the above-mentioned mixed aqueous solution, an aqueous ammonia and a sodium hydroxide aqueous solution were continuously added thereto for 2 hours while the pH was controlled to 11.6, to carry out the growth of particles.

When the reaction vessel was filled with the liquid, supply of the aqueous ammonia and the aqueous sodium hydroxide solution was terminated, stirring was terminated, to allow to stand in order to accelerate the settling of a product. After the product was settled down, a half aliquot of the supernatant was taken out from the reaction vessel, and then the supply of the aqueous ammonia and the aqueous sodium hydroxide solution was restarted. Furthermore, the aqueous ammonia and the aqueous sodium hydroxide solution were supplied to the reaction vessel for additional 2 hours (for 4 hours in total), and the supply was terminated. The resulting particles were washed with water, filtrated and dried to collect.

The subsequent procedures were carried out in the same manner as in Example 1, to give a cathode active material for a nonaqueous electrolyte secondary battery. The performance of the obtained cathode active material for a nonaqueous electrolyte secondary battery was examined in the same manner as in Example 1.

In addition, it was confirmed by a chemical analysis that the obtained cathode active material had a composition containing Li of 7.34% by mass, Ni of 51.5% by mass and Co of 9.44% by mass, which showed that the cathode active material had a composition of $Li_{1.019}Ni_{0.85}Co_{0.15}O_2$, and had a crystal structure of a hexagonal system as determined by a powder X-ray diffraction.

Comparative Example 1

A metal salt solution and an aqueous ammonia solution, which were the same as used in Example 1, and a liquid neutralizer were continuously added at a constant flow rate to a reaction vessel for continuous crystallization which was equipped with a pipe for overflowing at a top part, while maintaining its pH at 25° C. to a constant value of 12.0, and crystallization was carried out by using a usual method including continuously collecting a slurry overflowed. A cathode active material for a nonaqueous electrolyte secondary battery was obtained in the same manner as in Example 1 except that an average retaining period of time in the reaction vessel was controlled to 10 hours, and that the crystallized product was obtained by collecting a slurry and separating a solid matter from a liquid matter in the slurry after the equilibrium state was reached in the continuous vessel. The performance of the obtained cathode active material for a nonaqueous electrolyte secondary battery was examined in the same manner as in Example 1.

Comparative Example 2

A cathode active material for a nonaqueous electrolyte secondary battery was obtained in the same manner as in Example 1 except that the pH during the nucleation and during the growth was maintained at a constant value of 11.6, respectively at a liquid temperature of 25° C. The performance of the obtained cathode active material for a nonaqueous electrolyte secondary battery was examined in the same manner as in Example 1.

Comparative Example 3

A nickel composite hydroxide was obtained in the same manner as in Example 1 except that the pH during the nucleation and during the growth was maintained at a constant value of 12.6, respectively.

Since new nuclei were generated in the course of the whole period of the crystallization reaction, particles having an indeterminate form with a broad particle size distribution containing gelatinous deposited matter were formed. Therefore, the procedures were discontinued due to the difficulty in solid-liquid separation.

Comparative Example 4

A cathode active material for a nonaqueous electrolyte secondary battery was obtained in the same manner as in Example 1 except that the calcinating was carried out at a temperature of 860° C. for 12 hours and its properties were evaluated. From the results of measurement of X-ray diffraction, it was confirmed that its crystal structure of a hexagonal system was deformed, and any performance as a cathode active material could not be expected. Therefore, the evaluation of the battery was not carried out.

Comparative Example 5

A cathode active material for a nonaqueous electrolyte secondary battery was obtained in the same manner as in Example 1 except that the calcinating was carried out at 680° C. The performance of the obtained cathode active material for a nonaqueous electrolyte secondary battery was examined in the same manner as in Example 1.

(Evaluation)

From the results as shown in FIG. 5, the followings can be understood.

The composite hydroxide particles and cathode active materials obtained in Examples 1 to 11 were produced in accordance with the present invention. Therefore, both of the average particle diameter and the value of [(d90−d10)/average particle diameter] which is an index showing the spread of the particle size distribution are included within a desired range, respectively, and the particles had a favorable particle diameter distribution and an almost even particle diameter. The coin-type battery 1 which is produced by using these cathode active materials had a high initial discharge capacity, is excellent in cycle characteristic, and also has a low resistance of a positive electrode. Therefore, the battery has excellent characteristics.

According to Comparative Example 1, since a continuous crystallization method was employed, the nucleation and growth of particles cannot be carried out separately, and since the time period for the growth of particles is not constant, its particle size distribution becomes broader. Therefore, the coin-type battery 1 is poor in cycle characteristics although its initial discharge capacity is high.

According to Comparative Example 2, since each pH during the nuclear growth and during the growth of particles is 12 or less, respectively, the amount of nucleation was insufficient, and thus the composite hydroxide particles and the cathode active material both had large particle diameters. Therefore, the coin-type battery 1 in which this cathode active material was used lacks in reaction surface area, and has a high resistance of a positive electrode.

According to Comparative Example 3, since each pH during the nuclear growth and during the growth of particles is 12 or less, respectively, new nuclei are generated in the course of the whole period, and particles were miniaturized and aggregated. Therefore, the particle size distribution becomes broader, and production of a cathode active material also becomes difficult.

According to Comparative Examples 4 and 5, since the prosecution for producing a cathode active materials is different form that in the present invention, a cathode active material having favorable characteristics could not be obtained. In addition, according to Comparative Example 5, it can be seen that the coin-type battery 1 in which the cathode active material is used has a high resistance of a positive electrode, and is poor in initial discharge capacity and cycle characteristics.

From the foregoing results, it can be seen that the nickel composite hydroxide particles and a nonaqueous electrolyte secondary battery in which a cathode active material was used, those of which are obtained in each working example, have excellent characteristics such as high initial discharge capacity, excellent cycle characteristics and low resistance of a positive electrode.

INDUSTRIAL APPLICABILITY

The nonaqueous electrolyte secondary battery of the present invention is suitable for an electric power supply of a small size mobile electronic device which constantly requires a high capacity (notebook-sized personal computer, mobile phone terminal, and the like), and is also suitable for a battery for an electric automobile which requires a high power.

In addition, since the nonaqueous electrolyte secondary battery of the present invention is excellent in safety, and enables its size reduction and high power, the nonaqueous electrolyte secondary battery is suitable for an electric power supply for electric automobiles having limited mounting space.

In addition, the present invention can be adopted not only to an electric power supply for electric automobiles driven only by electric energy, but also to an electric power supply for a so-called hybrid automobile in which combustion engine such as a gasoline engine or diesel engine is used in combination.

DESCRIPTION OF SYMBOLS 1 coin-type battery
2 case 3 electrode
3a positive electrode
3b negative electrode
3c separator

The invention claimed is:

1. A process for producing nickel composite hydroxide particles, wherein the nickel composite hydroxide is represented by the general formula (I):

$$Ni_{1-x-y}Co_xM_y(OH)_{2+\alpha} \quad (I)$$

wherein $0 \leq x \leq 0.2$, $0 \leq y \leq 0.15$, $x+y<0.3$, $0 \leq \alpha \leq 0.5$, and M is at least one element selected from the group consisting of Mg, Al, Ca, Ti, V, Cr, Mn, Zr, Nb, Mo and W, said process comprising:

a step for nucleation comprising controlling the pH to 12.0 to 13.4 at a liquid temperature of 25° C. of an aqueous solution for nucleation containing a metal compound having an atomic ratio of the metals corresponding to the atomic ratio of the metals in the particles of the nickel composite oxide, and an ammonium ion donor, to carry out nucleation to form an aqueous solution for growth of particles containing nuclei, and a step for growth of particles for growing the nuclei, comprising controlling the pH to 10.5 to 12.0 at a liquid temperature of 25° C. of the aqueous solution for growth of particles obtained in the step for nucleation to grow the nuclei, wherein the pH in the step for growth of particles is controlled so as to be lower than the pH in the step for nucleation.

2. The process for producing nickel composite hydroxide particles, according to claim 1, wherein the aqueous solution for growth of particles is prepared by controlling the pH of the aqueous solution for nucleation after the completion of the step for nucleation.

3. The process for producing nickel composite hydroxide particles, according to claim 1, wherein an aqueous solution suitable for growth of particles is prepared, and the nuclei formed in the step for nucleation is added to the aqueous solution, to form the aqueous solution for nucleation.

4. The process for producing nickel composite hydroxide particles according to claim 1, wherein a part of the liquid portion of said aqueous solution for growth of particles is discharged, and thereafter the step for growth of particles is carried out.

5. The process for producing nickel composite hydroxide particles, according to claim 1, wherein each aqueous solution in the step for nucleation and the step for growth of particles is maintained to a temperature of 20° C. or more.

6. The process for producing nickel composite hydroxide particles, according to claim 1, wherein the concentration of ammonium ion in each aqueous solution in the step for nucleation and the step for growth of particles is maintained to be included in the range of 3 to 25 g/L.

7. The process for producing nickel composite hydroxide particles, according to claim 1, wherein the nickel composite hydroxide obtained in the step for growth of particles is covered with a compound having at least one of said additive elements in its molecule.

8. Nickel composite hydroxide particles comprising spherical secondary particles, wherein the nickel composite hydroxide is represented by the general formula (I):

$$Ni_{1-x-y}Co_xM_y(OH)_{2+\alpha} \quad (I)$$

wherein $0 \leq x \leq 0.2$, $0 \leq y \leq 0.15$, $x+y<0.3$, $0 \leq \alpha \leq 0.5$, and M is at least one additive element selected from the group consisting of Mg, Al, Ca, Ti, V, Cr, Mn, Zr, Nb, Mo and W, said spherical secondary particles are formed by the aggregation of plural platelike primary particles, and have an average particle diameter of 3 to 7 μm; and an index showing the extent of particle size distribution represented by the formula: [(d90−d10)/average particle diameter] is 0.55 or less.

9. The nickel composite hydroxide particles, according to claim 8, wherein said additive element is homogenously distributed in the secondary particles and/or the surface of the secondary particles is homogeneously covered with said additive element.

10. The nickel composite hydroxide particles, according to claim 8, wherein said nickel composite hydroxide particles are produced by the process wherein the nickel composite hydroxide is represented by the general formula (I):

$$Ni_{1-x-y}Co_xM_y(OH)_{2+\alpha} \quad (I)$$

wherein $0 \leq x \leq 0.2$, $0 \leq y \leq 0.15$, $x+y<0.3$, $0 \leq \alpha \leq 0.5$, and M is at least one element selected from the group consisting of Mg, Al, Ca, Ti, V, Cr, Mn, Zr, Nb, Mo and W, said process comprising:

a step for nucleation comprising controlling the pH to 12.0 to 13.4 at a liquid temperature of 25° C. of an aqueous solution for nucleation containing a metal compound having an atomic ratio of the metals corresponding to the atomic ratio of the metals in the particles of the nickel composite oxide, and an ammonium ion donor, to carry out nucleation to form an aqueous solution for growth of particles containing nuclei, and a step for growth of particles for growing the nuclei, comprising controlling the pH to 10.5 to 12.0 at a liquid temperature of 25° C. of the aqueous solution for growth of particles obtained in the step for nucleation to grow the nuclei, wherein the pH in the step for growth of particles is controlled so as to be lower than the pH in the step for nucleation.

11. A process for producing a cathode active material for a nonaqueous electrolyte secondary battery, wherein said cathode active material comprises a lithium-nickel composite oxide represented by the general formula (II):

$$Li_tNi_{1-x-y}Co_xM_yO_2 \quad (II)$$

wherein $0.95 \leq t \leq 1.15$, $0 \leq x \leq 0.2$, $0 \leq y \leq 0.15$, $x+y<0.3$, and M is at least one element selected from the group consisting of Mg, Al, Ca, Ti, V, Cr, Mn, Zr, Nb, Mo and W, said process comprises:

a step for thermally treating the nickel composite hydroxide particles, according to claim 8, a step for mixing a lithium compound with the particles after said thermal treatment, to give a mixture, and a step for calcining said mixture formed in the step for mixing at a temperature of 700° C. to 850° C.

12. The process for producing the cathode active material for a nonaqueous electrolyte secondary battery, according to claim 11, wherein the number of lithium atoms included in the mixture to the sum of the numbers of atoms of metals other than lithium (number of lithium atoms/sum of the numbers of atoms of metals other than lithium) is controlled to from 0.95/1 to 1.15/1.

13. The process for producing the cathode active material for a nonaqueous electrolyte secondary battery, according to claim 11, wherein the mixture is preheated at a temperature less than the melting point of the lithium compound and at a temperature capable of the reaction of the lithium compound and the particles after the thermal treatment, prior to the step for calcining the mixture.

* * * * *